US011169002B2

(12) United States Patent
Wang et al.

(10) Patent No.: US 11,169,002 B2
(45) Date of Patent: Nov. 9, 2021

(54) SENSOR SYSTEM FOR ROTATION ANGULAR DETECTION AND 3D JOYSTICK FUNCTION

(71) Applicant: Melexis Technologies SA, Bevaix (CH)

(72) Inventors: Hao Wang, Shanghai (CN); Zhenghao Cui, Shanghai (CN)

(73) Assignee: MELEXIS TECHNOLOGIES SA, Bevaix (CH)

( * ) Notice: Subject to any disclaimer, the term of this patent is extended or adjusted under 35 U.S.C. 154(b) by 93 days.

(21) Appl. No.: 16/801,442

(22) Filed: Feb. 26, 2020

(65) Prior Publication Data

US 2020/0271479 A1    Aug. 27, 2020

(30) Foreign Application Priority Data

Feb. 26, 2019    (EP) .................................... 19159541

(51) Int. Cl.
   *G01D 5/14*    (2006.01)
   *G05G 9/047*   (2006.01)
   *B64C 13/04*   (2006.01)

(52) U.S. Cl.
   CPC ............. *G01D 5/145* (2013.01); *G05G 9/047* (2013.01); *B64C 13/0421* (2018.01); *G05G 2009/04755* (2013.01)

(58) Field of Classification Search
   CPC .................................................... G01D 5/145
   See application file for complete search history.

(56) References Cited

U.S. PATENT DOCUMENTS

| 6,288,533 B1 | 9/2001 | Haeberli et al. |
| 6,573,709 B1 | 6/2003 | Gandel et al. |
| 2011/0025313 A1 | 2/2011 | Zangl et al. |

(Continued)

FOREIGN PATENT DOCUMENTS

| GB | 2505226 A | 2/2014 |
| WO | 0169343 A1 | 9/2001 |

OTHER PUBLICATIONS

Search Report and Written Opinion from corresponding European Application No. EP20159460, dated Dec. 9, 2020.

(Continued)

*Primary Examiner* — Reena Aurora
(74) *Attorney, Agent, or Firm* — Workman Nydegger

(57) ABSTRACT

A sensor system and a joystick including the sensor system. The sensor system comprises a magnetic field sensor, and first and second magnetic sources. The first magnetic source is rotatable relative to a sensitive surface of the sensor and generates a first magnetic field contribution of at least quadrupolar order. The second magnetic source is pivotable with respect to the sensitive surface and generates a second magnetic field contribution. The sensor is configured for detecting at least an in-plane component of a superimposition field of the first and second magnetic contributions at a plurality of lateral measurement locations on the sensitive surface, obtaining measurements, and determining a rotation angle for the first source from the field gradient measurements and two angular directions for the second source from the field mean measurements. Lateral measurement locations are arranged into two pairs of diametrically opposite measurement locations with respect to the sensitive surface.

20 Claims, 6 Drawing Sheets

(56) References Cited

U.S. PATENT DOCUMENTS

2012/0025809 A1* 2/2012 Banerjee .................. G01D 5/12
                                                    324/207.2
2015/0377648 A1   12/2015 Sirohiwala et al.
2016/0033586 A1    2/2016 Hakenes
2016/0334830 A1*  11/2016 Sirohiwala ............... G05G 5/05
2019/0316939 A1*  10/2019 Yamamoto ......... G01D 5/24495

OTHER PUBLICATIONS

European Search Report of Application No. EP19159541.2, dated Aug. 23, 2019.

* cited by examiner

SENSOR SYSTEM FOR ROTATION ANGULAR DETECTION AND 3D JOYSTICK FUNCTION

FIELD OF THE INVENTION

The present invention relates to the field of position sensing in general, and relates to non-contact magnetic field sensing devices for determination of 3D position in applications with rotation angular detection and 3D joystick function in particular.

BACKGROUND OF THE INVENTION

Joystick controllers are commonly used for simulating flight control or for steering and navigating of aircraft vehicles. A single control-element, i.e. the stick, combines the control of multiple axes and is operable by one hand.

Full three-axis control enabled by a single joystick handle is disclosed in the international application WO 01/69343 A1 in which a third axis is controlled by means of rotating the shaft. Non-contact measurements using Hall-effect sensors are a preferred choice for joysticks since they reduce mechanical wear and tear. WO 01/69343 A1 provides three magnets and three respective Hall sensors to provide three independent output signals, one per control axis, from which the joystick orientation and handle rotation are extracted.

Melexis' MLX30333 absolute position sensor IC uses advanced planar Hall technology to provide 3D joystick function that outputs two angles using only a single position sensor and a single magnet.

A full three-axis controller requiring only one position sensors and easy to assemble remains an unsolved problem.

SUMMARY OF THE INVENTION

It is an object of embodiments of the present invention to provide a sensor system comprising a single magnetic field sensor for position sensing in a joystick application, providing both rotation angular detection and 3D functionality.

The above objective is accomplished by a sensor system according to embodiments of the present invention.

In a first aspect of the invention, a sensor system for use in a joystick is disclosed. The sensor system comprises a magnetic field sensor with a sensitive surface, a first magnetic source, and a second magnetic source. The first magnetic source is rotatably mounted relative to the sensitive surface and is generating a first magnetic field contribution of at least quadrupolar order at the sensitive surface. A rotating movement of the first magnetic source with respect to the sensitive surface is defined by a rotation angle $\alpha$. The second magnetic source is pivotable to a plurality of source orientations with respect to the sensitive surface and is generating a second magnetic field contribution at the sensitive surface. Each source orientation with respect to the sensitive surface is defined by two angular directions $\theta, \phi$. Furthermore, the magnetic field sensor is configured for detecting at least an in-plane component of a superimposition field of the generated first and second magnetic field contributions for each of a plurality of lateral measurement provided on the sensitive surface. The plurality of lateral measurement locations are arranged laterally and into at least two pairs of diametrically opposite measurement locations with respect to a center location on the sensitive surface. The same in-plane component of the superimposition field is detected at the measurement locations corresponding to a same pair of lateral measurement locations.

The magnetic field sensor is further configured for obtaining measurements indicative of a field gradient for at least two in-plane components of the first magnetic field contribution, based on a plurality of detected spatial components of the superimposition field corresponding to the plurality of lateral measurement locations, and for obtaining measurements indicative of a field mean for at least two in-plane components of the second magnetic field contribution at the center location, based on a plurality of detected spatial components of the superimposition field corresponding to the plurality of lateral measurement locations and/or based on at least two further detected in-plane components of the superimposition field at the center location. In addition thereto, the magnetic field sensor is configured for determining the rotation angle $\alpha$ for the first magnetic source from the obtained field gradient measurements and the two angular directions $\theta, \phi$ for the second magnetic source from the obtained field mean measurements.

In particular embodiments of the invention, the diametrically opposite measurement locations of the pair are arranged equidistantly to the center location. This simplifies the measurements directed to field gradients and field means, because a distance-related weighting of detected components of the superimposition field can be omitted, or at least factored out. Typically, the lateral measurement locations are positioned close to the center location, wherein close means at in-plane distances small compared to the characteristic length scale over which the second magnet field contribution generated by the second magnetic source evolves in the plane of the sensitive surface, but on the same order of magnitude, or larger, as the characteristic length scale over which the first magnet field contribution generated by the first magnetic field source evolves in that same plane.

According to some embodiments of the invention, the magnetic field sensor is further configured for obtaining a measurement indicative of a field mean for an out-of-plane component of the second magnetic field contribution at the center location, based on a plurality of detected spatial components of the superimposition field corresponding to the plurality of lateral measurement locations and/or based on a further detected out-of-plane component of the superimposition field at the center location. An additional measurement directed to the out-of-plane component of the second magnetic field contribution has the advantage that a more robust sensor system can be obtained, which is taking into account variations (e.g. thermal variations) in the magnetization of the second magnetic source and/or variations in a surface normal distance of the second magnetic source with respect to the sensitive surface, caused by mechanical drifts or pivoting movements of the second source.

According to some embodiments of the invention, the magnetic field sensor is configured for obtaining measurements indicative of the field gradient and/or the field mean by combining sums and/or differences of the detected spatial components of the plurality of detected spatial components of the superimposition field corresponding to a same pair of lateral measurement locations on the sensitive surface. The calculation of sums and differences of detected field components are easy-to-implement in a signal processing unit and are well-suited for a prompt and energy efficient determination of the rotation angle and the two angular directions by the sensor system. In particular embodiments of the invention, the sensor system comprises therefore also a signal processing unit or a position determination module (e.g. loadable and executable instructions of a computer program product), which is configured for combining the sums and/or differences of the detected spatial components and, based thereon, determining the rotation angle and the two angular directions.

According to some embodiments of the invention, the magnetic field sensor is configured for determining the two angular directions $\theta$, $\phi$ for the second magnetic source from the obtained field mean measurements by providing a physical model for the second magnetic source to relate variations in the second magnetic field contribution generated at the center location to variations in the two angular directions $\theta$, $\phi$, and determining the two angular directions as a solution to the physical model, using the obtained field mean measurements at the center location as model constraints. Such a physical model may be a set of (non-linear) equations describing the components of the second magnetic field contribution generated at the center location as a function of the two angular directions $\theta$, $\phi$ for the second magnetic source, for instance equations describing the second magnetic field contribution as a dipole field associated with a point-like dipole source as second magnetic source.

According to some embodiments of the invention, the magnetic field sensor is configured for detecting two different in-plane components, or an in-plane component and an out-of-plane component, of the superimposition field for at least one of plurality of lateral measurement locations and the center location. Detecting more than a single component of the superimposition field at one of the plurality of lateral measurement locations and the center location is of advantage because a number of measurement locations provided on the sensitive surface may be reduced. In consequence, magnetic field sensing elements (e.g. Hall-effect probes) may be provided more compactly and may be less distributed on the sensitive surface of the sensor, which allows area-efficient implementations of semiconductor chip-based magnetic field sensors, for instance.

According to some embodiments of the invention, an angle formed between lines connecting the two lateral measurement locations of each pair of lateral measurement locations is an integer multiple of 45 arc degrees. This particular angular interval has the advantage that in-phase and quadrature components (e.g. orthogonal trigonometric signals sin and cos) of the in-plane projections of the first magnetic field contribution can be obtained. A ratio of the in-phase and quadrature components has the additional advantage of being independent of the vector norm (e.g. field strength) of the generated first magnetic field contribution, e.g. independent of a magnetic strength or magnetization of the first magnetic source and of a surface normal distance of the first magnetic source with respect to the sensitive surface, which allows for a more robust rotation angle determination by the sensor system.

In a further aspect, the invention relates to a sensor system for use in a joystick, which comprises a magnetic field sensor with a sensitive surface, a first magnetic source and a second magnetic source for respectively generating a first magnetic field contribution and a second magnetic field contribution at the sensitive surface. The generated first magnetic field contribution is of at least quadrupolar order. The first magnetic source is rotatably mounted relative to the sensitive surface, wherein a rotating movement of the first magnetic source with respect to the sensitive surface is defined by a rotation angle $\alpha$, whereas the second magnetic source is pivotable to a plurality of source orientations with respect to the sensitive surface, wherein each source orientation with respect to the sensitive surface is defined by two angular directions $\theta$, $\phi$. Furthermore, the magnetic field sensor is configured for detecting three spatial components of a superimposition field of the generated first and second magnetic field contributions at a center location on the sensitive surface, for providing a physical model for the magnetic sources to relate variations in the superimposition field generated at the center location to variations in the rotation angle $\alpha$ and the two angular directions $\theta$, $\phi$, and for determining the rotation angle for the first magnetic source and the two angular directions for the second magnetic source as a solution to the physical model, using the detected components of the superimposition field at the center location as model constraints. Such a physical model may be a set of (non-linear) equations describing the components of the superimposition field generated at the center location as a function of the rotation angle $\alpha$ of the first magnetic source and the two angular directions $\theta$, $\phi$ for the second magnetic source, for instance equations describing the superimposition field as a linear superimposition of the first and second magnetic field contributions as a quadrupole and dipole field, respectively, associated with a point-like quadrupole and dipole source as first and second magnetic source.

In embodiments of the first or second aspect, a rotation axis for the rotatably mounted first magnetic source may intersect the sensitive surface of the magnetic field sensor at the center location.

In embodiments of the invention according to the first or second aspect, the first magnetic source may be a quadrupole, hexapole, or octupole permanent magnet, and/or the second magnetic source may be a dipole electromagnet or dipole permanent magnet.

In some embodiments of the invention according to the first or second aspect, the second magnetic field contribution generated at the sensitive surface by the second magnetic source may be approximated as a constant magnetic field with vanishing field gradient, in particular if the pivot point of the second magnetic source is located close to the sensitive surface, for instance at surface normal distances of the order of the distance between the center location and the lateral measurement locations. More generally, even if the second magnetic field contribution generated at the sensitive surface by the second magnetic source is not well approximated by a constant magnetic field, field gradients associated with the second magnetic field contribution are preferably weak enough to be neglected, e.g. the following conditions are approximately satisfied: $dB_{m2,z}/dx=0$, $dB_{m2,z}/dy=0$, $dB_{m2,x}/dz \ll |\text{grad}_{x,y} B_{m1}|$ and $dB_{m2,y}/dz \ll |\text{grad}_{x,y} B_{m1}|$, e.g. weak field gradient as compared to the stronger in-plane field gradients generated by the first magnetic source.

In particular embodiments of the invention according to the first or second aspect, the magnetic field sensor comprises a plurality of magnetic field sensing elements arranged at the plurality of measurement locations on the sensitive surface. At least one of the plurality of magnetic field sensing elements comprises at least one of the group consisting of a planar Hall-effect probe, a magneto-resistive probe, a vertical Hall-effect probe, and a fluxgate probe, wherein probes may be configured as single-axis or multi-axes probes.

In yet a further aspect, the present invention is disclosing a joystick comprising a sensor system according to any of the embodiments of the preceding aspects. The joystick may further comprise a handle that is rotatable around a longitudinal axis of the joystick, in correspondence with an axis of rotation for the first magnetic source. Additionally, the handle is pivotable around two transverse axes of the joystick, corresponding to a pivoting movement of the second magnetic source.

It is an advantage of embodiments of the present invention that only a single, position-sensing magnetic field sensor is required to accurately provide angular rotation detection and 3D joystick function in an application. This may be of particular interest in flight control devices that rely on joysticks to implement angular rotation detection and 3D joystick function, e.g. for generating translations in all three directions X, Y, and Z, or for generating rotations specified in terms of pitch, roll, and yaw angle. Including only a single magnetic field sensor potentially saves manufacturing costs for those devices, simplifies their design, makes them faster and more reliable.

A non-contact measurement of a magnetic field generated by two magnetic sources is advantageous since it eliminates mechanical wear in joystick applications, which extends the lifetime of those devices.

Decomposing the sensed superimposition field into a first magnetic field contribution and a second magnetic field contribution has the advantage that the sensor system is capable of detecting and compensating magnetic stray fields, thermal drifts of the magnetic source magnetizations, and offsets in the relative positions and orientations of the magnetic sources, making the measurements more robust and accurate.

In some embodiments of the present invention, the first magnetic source may be a multipole permanent magnet not having a significant dipolar moment at the sensitive surface, e.g. a magnet having 2+2n' poles with n' being an integer, such as a quadrupole, hexapole, or octupole magnet. The second magnetic source may be a dipole magnet. Those magnets are readily available, e.g. as permanent magnets or energized coil arrangements, and the use of a first magnet with a higher number of poles may generate discrete, n-fold rotational symmetries (still breaking the circular symmetry) of the magnetic field at the sensitive surface of the magnetic field sensor, thus allowing for the implementation of a higher number of magnetic field sensing elements thereon, e.g. planar Hall probes, and from which higher order correction terms, with respect to the to be detected superimposition field and its decomposition into first and second magnetic vector field contributions, are obtainable. Applying higher order correction schemes then augments the sensor system accuracy for determining angular directions and rotation angle.

According to an embodiment of the present invention, the first magnetic source may be positioned above the sensitive surface of the magnetic field sensor in such a way that its poles are arranged on in a plane parallel to the sensitive surface, and the second magnetic source may be positioned below the sensitive surface of the magnetic field sensor in such a way that it is separated therefrom by a predetermined distance and its dipole moment, for a reference position and source orientation, at rest, is oriented perpendicularly to the sensitive surface. Such a configuration of the two magnetic sources is beneficial since it exploits the symmetry of commonly available, commercial magnets, e.g. shaft magnets, which typically exhibit a cylindrical shape. For such alignment configuration of the two magnets, the position offsets are minimized, which makes the sensor system calibration more expedite.

According to an embodiment of the present invention, the changes in the relative position between the second magnetic source and the sensitive surface during a pivoting movement may be confined to a hemispherical surface portion. In other words, the possible relative positions of a center point of the second magnetic source with respect to the sensitive surface may be confined to a surface of a spherical cap. Such an embodiment has the advantage that a distance between the center pf the second magnetic source and the center location on the sensitive surface is well-controlled and substantially kept constant, corresponding to the predetermined surface normal distance in the reference second source position at rest. Therefore, relative position and orientation changes of the second magnetic source may be conveniently characterized together by two coordinates only, for instance by an elevation angle and an azimuthal angle. The varying vector norm of the second magnetic field contribution at the center location is eliminated in such embodiments, which simplifies the signal processing and analysis necessary to determine the angular directions for the second magnetic source. However, additional information obtained in respect of the vector norm, e.g. by detecting an out-of-plane component of the superimposition field, may still be used to improve the sensor system accuracy. Besides, such an embodiment is particularly well-suited for joystick applications in which the handle is mounted in a way that allows its motion on an imaginary hemispherical surface portion. Its position is stated in terms of an elevation angle and an azimuthal angle. Calculations involving the spherical angular coordinates are more efficient given the high amount of symmetry in allowed paths of motion of the second magnet with respect to the single position sensor and the availability of trigonometric formulae.

According to an embodiment of the present invention, the second magnetic source may be in a fixed position and the magnetic field sensor may be attached to a shaft, for example a joystick handle. The second magnetic source is thus displaced with respect to the magnetic field sensor by means of the shaft. More specifically, the shaft, together with the magnetic field sensor, may be coupled to a gimbal or ball-and-socket mount. This may provide the means for adjusting a relative position between the second magnetic source and the magnetic field sensor according to an embodiment of the invention.

This mechanical gimbal suspension or ball-and-socket mount of the magnetic field sensor with respect to the second magnetic source according to an embodiment of the present invention fulfills the previous requirements on constraining paths of motion of the second magnetic source relative to the magnetic field sensor. It is a well-known, reliable means of mechanical coupling.

According to another embodiment of the present invention, the second magnetic source may be mechanically coupled to the first magnetic source using coupling means, e.g. glue. Together, first and second magnetic sources may be attached to a shaft, for example a joystick handle, such that a center position of the second magnetic source remains constant under the user's actions on the shaft and only its associated magnetic moment orientation is changed. This may happen independently of a rotation of the first magnetic source around the rotation axis.

According to an embodiment of the present invention, the first magnetic source may be rotated around an axis of rotation that is perpendicular to the sensitive surface, i.e. forming a ninety arc degree angle therewith. Restricting the rotative movement of the first magnetic source to take place in a plane parallel to the sensitive surface is beneficial as the generated first magnetic field contribution at the sensitive surface reflects, also dynamically, the discrete, n-fold rotational symmetric arrangement of poles of the first magnetic source.

In an embodiment of the present invention, the first magnetic source may be attached to a shaft, for example of a joystick, and means for rotating the first magnetic source are provided by the mechanical rotation elements of the shaft. This embodiment does not require a separate rotation element for the first magnetic source other than that which is already provided by a joystick handle in a joystick application. It is therefore particularly easy to integrate into a joystick application. No further control on top of the shaft or handle is necessary, avoiding wires running along the hollow of the shaft with the related problems of shielding and wear.

In embodiments of the invention, the magnetic field sensor may comprise a three-axis magnetic field sensing element at the center location, or a plurality of magnetic field sensing elements, for instance at least four magnetic field sensing elements. Magnetic field sensing elements may comprise single-axis or multi-axes planar or vertical Hall-effect probes. Planar Hall-effect probes are parallel to the sensitive surface of the magnetic field sensor and form a sensitive area of the magnetic field sensor. They are a well-known magnetic field sensing elements that are ideally suited for integration and processing into integrated sensor chips. This signifies that highly compact sensing circuits and sensor systems are rendered possible. Their miniaturization saves costs and makes downstream integration much easier, e.g. small Hall sensors for automotive applications such as throttle position or steering wheel position sensing. Moreover, planar integrated Hall probes do not require expensive or exotic/foreign probe materials and may be fabricated as n-wells in a p-doped semiconductor substrate. Alternatively, Hall probes may also be transfer-printed onto a planar substrate.

In embodiments of the invention, the magnetic field sensor may further comprise a plurality of magnetic flux concentrators arranged on the sensitive surface for concentrating the magnetic flux density of the generated magnetic field contributions at locations on the sensitive surface at which the magnetic field sensing elements are provided.

Magnetic flux concentrators have the advantage of being readily available as ferromagnetic thin-film layers for integration into an integrated sensor chip. They concentrate magnetic field lines in their inner body as well as on their edges. Due to their high magnetic permeability values, magnetic flux concentrators are often characterized in that magnetic field lines enter and leave their surfaces at nearly ninety arc degree angles. The concentrating action of the magnetic flux concentrators is thus beneficial for the magnetic field sensor sensitivity since the magnetic field sensed by the magnetic field sensing elements, e.g. the planar Hall probes, is locally enhanced, thereby increasing the signal-to-noise ratio. The near ninety arc degree angles of magnetic field lines entering and leaving the magnetic flux concentrator surfaces facilitates the design of the magnetic field sensor as the calculation or prediction of magnetic field lines is simplified.

In an embodiment of the present invention, the plurality of magnetic flux concentrators may comprise a first, e.g. disk-like, magnetic flux concentrator which is aligned, on a same axis, with the centers of the first magnetic source and the second magnetic source in the reference position and orientation. A set of second, e.g. wedge-shaped, magnetic flux concentrators may be circularly and substantially equidistantly arranged around the first magnetic flux concentrator in their center. In this case, a gap may be created between the inner edges of each of the set of second magnetic flux concentrators and the edge of the first magnetic flux concentrator.

An embodiment of this kind has the advantage that magnetic field lines near the gaps are concentrated and bent to near ninety arc degree angles such that they run almost perpendicularly to the sensitive surface. Redirecting the flow of magnetic field lines, running parallel to the sensitive surface, into a direction perpendicular to it, enables the use of integrated planar Hall probes. The latter only detect the portion of a magnetic field that penetrates its surface at right angles. Hence it is possible to stack magnetic flux concentrators on top of integrated planar Hall probes without losing detectability of parallel components of the magnetic field generated by the two magnets. The circular arrangement is advantageous because it agrees with the rotation symmetry of many cylindrically shaped magnets.

In a particular embodiment of the present invention, the magnetic field sensor may be an integrated semiconductor device, e.g. a semiconductor sensor chip.

This enables the manufacturing of densely integrated, low-cost magnetic field sensors and sensor systems in a cheaper, more compact application device. Integrated semiconductor devices may be surface mounted on a printed circuit board and only require small volumes of magnetic material for magnetic field sensing.

In embodiments of the present invention, the sensor system, e.g. the magnetic field sensor of the sensor system, may further comprise a processing unit adapted for determining and compensating an offset in the reference position for the second magnetic source, e.g. second magnet. This offset in the reference position is defined as the deviation of the default or idle position of the second magnetic source with respect to sensitive surface of the magnetic field sensor from a surface normal orientation (e.g. zero elevation angle) at surface normal distance d2, prior to a pivoting movement of the second magnetic source. The processing unit may further be adapted for determining and compensating an offset in the ninety arc degrees reference angle formed by the axis of rotation for the first magnetic source and the sensitive surface of the magnetic field sensor.

A processing unit adapted for determining and compensating offsets may be used in a calibration procedure of the sensor system. This is beneficial in the sense that errors related to the positioning of the two magnetic sources may be compensated without compromising the sensor system overall accuracy. This greatly relieves tight control on positional error margins of the two magnetic sources, e.g. the two magnets, which makes the assembly step less demanding, faster, and cheaper. It also confers more robustness to the sensor system in many practical settings.

Particular and preferred aspects of the invention are set out in the accompanying independent and dependent claims. Features from the dependent claims may be combined with features of the independent claims and with features of other dependent claims as appropriate and not merely as explicitly set out in the claims.

For purposes of summarizing the invention and the advantages achieved over the prior art, particular objects and advantages of the invention have been described herein above. Of course, it is to be understood that not necessarily all such objects or advantages may be achieved in accordance with any particular embodiment of the invention. Thus, for example, those skilled in the art will recognize that the invention may be embodied or carried out in a manner that achieves or optimizes one advantage or group of advantages as taught herein without necessarily achieving other objects or advantages as may be taught or suggested herein.

The above and other aspects of the invention will be apparent from and elucidated with reference to the embodiment(s) described hereinafter.

BRIEF DESCRIPTION OF THE DRAWINGS

The invention will now be described further, by way of example, with reference to the accompanying drawings, in which.

Figure 1:
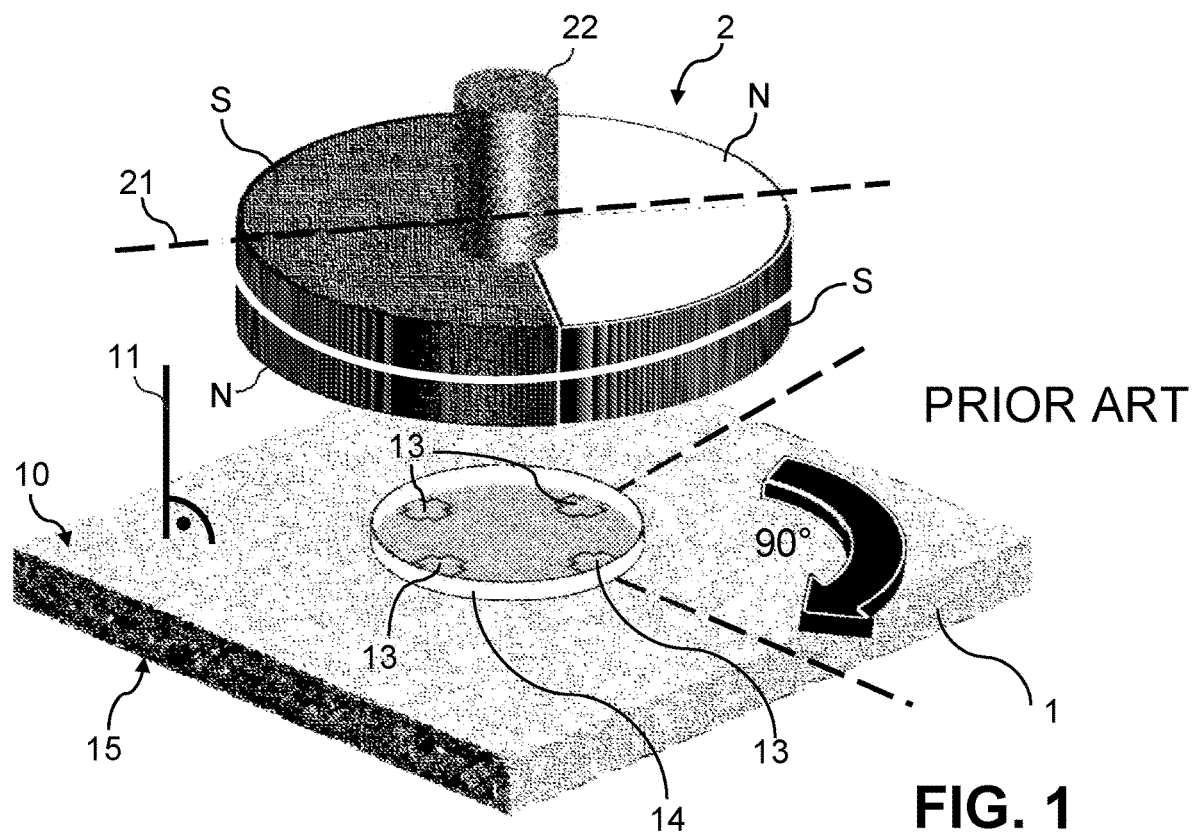
FIG. 1 is a view of a prior art sensor system using an integrated magnetic flux concentrator and four Hall probes to accurately determine the rotation angle of a shaft magnet placed above a magnetic field sensor.

The drawings are only schematic and are non-limiting. In the drawings, the size of some of the elements may be exaggerated and not drawn on scale for illustrative purposes. The dimensions and the relative dimensions do not necessarily correspond to actual reductions to practice of the invention.

Any reference signs in the claims shall not be construed as limiting the scope.

In the different drawings, the same reference signs refer to the same or analogous elements.

DETAILED DESCRIPTION OF ILLUSTRATIVE EMBODIMENTS

The present invention will be described with respect to particular embodiments and with reference to particular drawings but the invention is not limited thereto but only by the claims.

The terms first, second and the like in the description and in the claims, are used for distinguishing between similar elements and not necessarily for describing a sequence, either temporally, spatially, in ranking or in any other manner. It is to be understood that the terms so used are interchangeable under appropriate circumstances and that the embodiments of the invention described herein are capable of operation in other sequences than described or illustrated herein.

Moreover, directional terminology such as top, bottom, front, back, leading, trailing, under, over and the like in the description and the claims is used for descriptive purposes with reference to the orientation of the drawings being described, and not necessarily for describing relative positions. Because components of embodiments of the present invention can be positioned in a number of different orientations, the directional terminology is used for purposes of illustration only, and is in no way intended to be limiting, unless otherwise indicated. It is, hence, to be understood that the terms so used are interchangeable under appropriate circumstances and that the embodiments of the invention described herein are capable of operation in other orientations than described or illustrated herein.

It is to be noticed that the term "comprising", used in the claims, should not be interpreted as being restricted to the means listed thereafter; it does not exclude other elements or steps. It is thus to be interpreted as specifying the presence of the stated features, integers, steps or components as referred to, but does not preclude the presence or addition of one or more other features, integers, steps or components, or groups thereof. Thus, the scope of the expression "a device comprising components A and B" should not be limited to devices consisting only of components A and B. It means that with respect to the present invention, the only relevant components of the device are A and B.

Reference throughout this specification to "one embodiment" or "an embodiment" means that a particular feature, structure or characteristic described in connection with the embodiment is included in at least one embodiment of the present invention. Thus, appearances of the phrases "in one embodiment" or "in an embodiment" in various places throughout this specification are not necessarily all referring to the same embodiment, but may. Furthermore, the particular features, structures or characteristics may be combined in any suitable manner, as would be apparent to one of ordinary skill in the art from this disclosure, in one or more embodiments.

Similarly it should be appreciated that in the description of exemplary embodiments of the invention, various features of the invention are sometimes grouped together in a single embodiment, figure, or description thereof for the purpose of streamlining the disclosure and aiding in the understanding of one or more of the various inventive aspects. This method of disclosure, however, is not to be interpreted as reflecting an intention that the claimed invention requires more features than are expressly recited in each claim. Rather, as the following claims reflect, inventive aspects lie in less than all features of a single foregoing disclosed embodiment. Thus, the claims following the detailed description are hereby expressly incorporated into this detailed description, with each claim standing on its own as a separate embodiment of this invention.

Furthermore, while some embodiments described herein include some but not other features included in other embodiments, combinations of features of different embodiments are meant to be within the scope of the invention, and form different embodiments, as would be understood by those in the art. For example, in the following claims, any of the claimed embodiments can be used in any combination.

In the description provided herein, numerous specific details are set forth. However, it is understood that embodiments of the invention may be practiced without these specific details. In other instances, well-known methods, structures and techniques have not been shown in detail in order not to obscure an understanding of this description.

Definitions

Magnetic field is a term of general use and should be understood as referring more specifically to the magnetic flux density field in the context of magnetic field measurements using Hall probes and the like.

Magnets generating magnetic fields may include solid permanent magnets and electromagnets for which a current conductor winding, typically around a magnetic core, is the source of magnetism. In the context of the present application, the terms magnetic field generating means and magnetic source may be used interchangeably.

When reference is made in the present invention disclosure to a pair of diametrically opposite measurement locations on a sensitive surface of a magnetic field sensor, two measurement locations arranged on a diameter are meant, i.e. two measurement locations arranged on, or connected by, a straight line passing through the center location of a round (imaginary) contour on the sensitive surface. The diametrically opposite measurement locations of the pair do not have to be equidistant to this center location, but typically are arranged equidistantly thereto.

When reference is made in the present invention disclosure to a field mean (e.g. a measurement indicative of a field mean) at a particular location on the sensitive surface of the magnetic field sensor, an average value of the field at that location is meant. This average or mean field is a vector entity, e.g. is comprising average values of the in-plane components and of the out-of-plane component.

Figure 3:
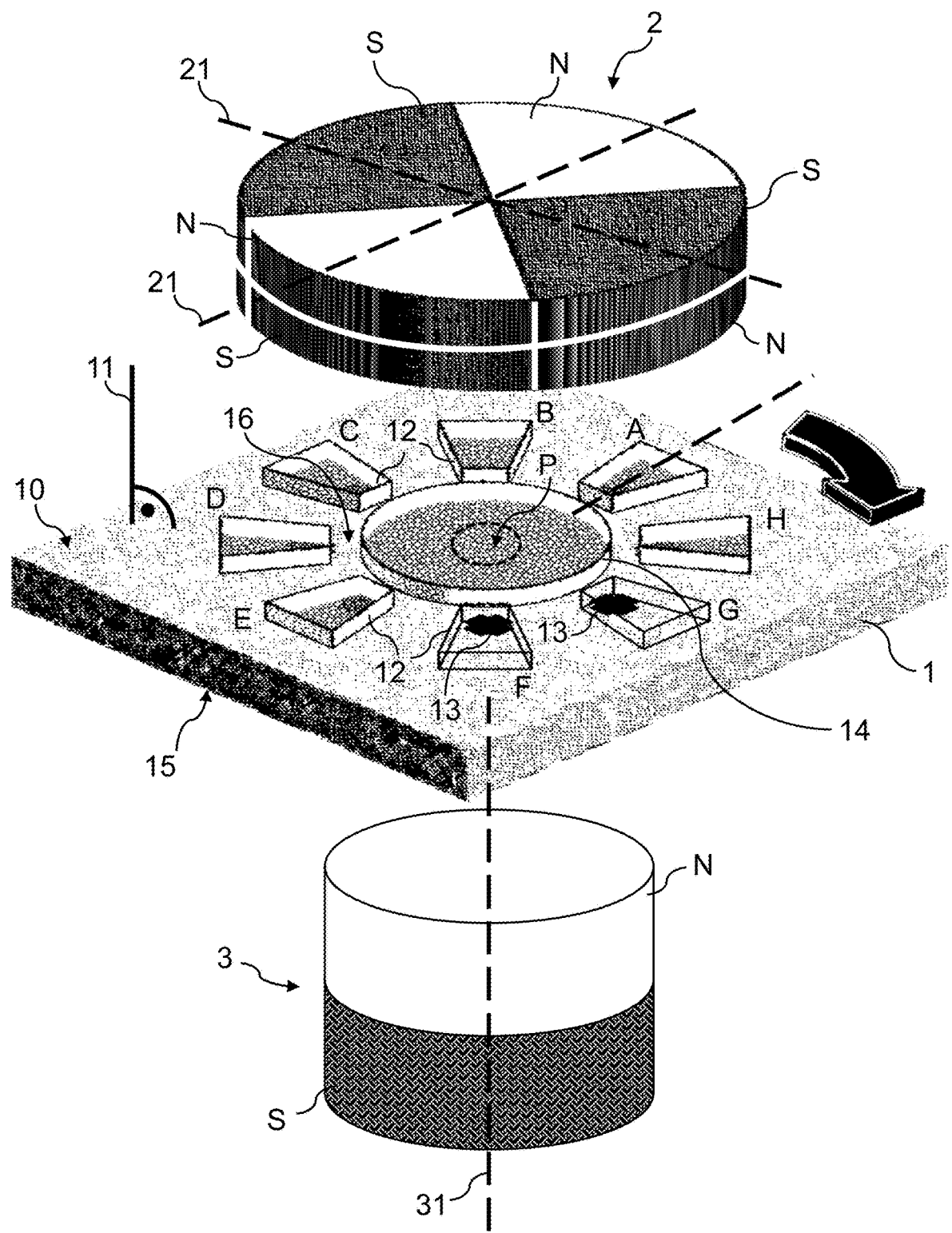
FIG. 3 shows an exemplary embodiment of the present invention, including an arrangement of a magnetic field sensor having multiple integrated magnetic flux concentrators and eight Hall probes, a top eight-pole magnet generating a quadrupolar field at the magnetic field sensor and a bottom dipole magnet for determining rotation angle and providing 3D joystick function in a same application.

Embodiments of the first aspect of the present invention are directed to a sensor system for detecting rotation angles and for providing 3D joystick functionality in an application, e.g. in a 3D joystick application. An exemplary embodiment of the present invention is depicted in FIG. 3, wherein the sensor system is comprising a single magnetic field sensor 1 and two permanent magnets as the first and second magnetic sources 2, 3, arranged in close proximity to the magnetic field sensor 1. The magnetic field sensor 1 is at least partially flat and defines a sensitive first surface 10 and a second surface 15, which are opposite to each other. In a particular embodiment of the invention, these may be the top and bottom surface of an integrated magnetic field sensor chip. The first magnet 2 may be placed above the sensitive surface 10, e.g. the top surface, and the second magnet 3 may be placed below the second surface 15, e.g. the bottom surface of the magnetic field sensor 1.

Furthermore, the first magnet 2, e.g. an octupole magnet, is positioned in such a way that it generates a quadrupolar magnetic field contribution at the sensitive surface 10. Its magnetic poles (point-like) are located in a plane parallel to the sensitive surface 10 of the magnetic field sensor 1. In FIG. 3, this plane is spanned by two orthogonal lines 21 that connect magnetic poles of the same polarity and that are lines of reflection symmetry in the spanned plane. Therefore, the first magnet 2 and the magnetic field emanating therefrom have a discrete, two-fold rotational symmetry (i.e. less symmetric than continuous circular symmetry), both in the plane of magnetic poles and at the sensitive first surface 10.

The second magnet 3, e.g. a permanent dipole magnet, is positioned in such a way that its dipole moment at rest is oriented along the line 31, which is connecting its two poles 'N' and 'S'. In particular embodiments of the invention, the line 31 at rest is, as shown in FIG. 3, substantially perpendicular (e.g. surface normal) to the sensitive surface 10 of the magnetic field sensor 1, i.e. is substantially parallel to a corresponding surface normal 11. A predetermined distance along the surface normal direction 11 exists between the second magnet 3 at rest and the sensitive first surface 10, comprising an air gap between the second surface 15 and the second magnet 3. The so defined rest position for the second magnetic source 3 also describes a reference position in respect of pivoting movements of the second magnetic source 3 about the surface normal 11. Or, expressed differently, the predetermined distance, together with the perpendicular orientation of the magnetic moment of the second magnetic source 3 at rest (e.g. the dipole moment orientation 31 of the second magnet), defines a reference position for dynamic changes in the relative position between the second magnetic source, e.g. the second magnet 3, and the sensitive surface 10 of the magnetic field sensor 1. The predetermined distance is dependent on the range of sensed relative positions in an application, e.g. angular ranges for the azimuthal and elevation angle, the size and strength of the second magnet 3, etc., but is typically in the millimeter range, e.g. 0.5 mm to 20 mm, or more. It may be more convenient to determine a predetermined distance as a function of the resulting magnetic field strength at the sensitive surface 10. This has the advantage that saturation effects and non-linear transfer characteristics of the magnetic field sensor 1 are avoided. Magnetic field strengths of 10 mT to 100 mT are non-limiting examples.

The first magnetic source, e.g. the first magnet 2, is rotatable around its axis of symmetry, which is congruent with the axis of rotation for the first magnetic source 2, about which a rotation angle is defined. A rotation action may be achieved by attaching the first magnet 2 to the inner wall or to the end portion of a shaft 22, e.g. a joystick handle. This aspect is further detailed in the part of the description that relates to FIGS. 12-15. In the embodiment of FIG. 3, the axis of rotation of the first magnet 2 is parallel to the surface normal 11. However, due to assembly imperfections, an angle formed between the rotation axis and the sensitive surface 10 may differ from ninety arc degrees, e.g. angles less than ninety arc degrees are tolerable, e.g. angles between eighty and ninety arc degrees.

The second magnet 3 is displaceable in three-dimensional space relative to the sensitive surface 10 of the magnetic field sensor 1. This may be obtained by attaching the magnetic field sensor 1 to the end portion of a shaft, e.g. a joystick handle, in such a way that it the sensor 1 is still rotatable with respect to the first magnet 2. By doing so, the magnetic field sensor 1 is actively displaceable with respect to the second magnet 3. For instance, the magnetic field sensor 1 is attached to the end portion of an inner cylinder, or rod, of a handle and the first magnet 2 is mechanically coupled to a surrounding, hollow tube of the handle, which tube is rotatable with respect to the inner cylinder/rod. This way, the magnetic field sensor 1 may be displaced along a portion of an imaginary hemispherical surface, e.g. a spherical cap, relative to the second magnet 3. The relative displacement may be characterized in terms of azimuthal and elevation angle coordinates; this defines a dynamic relative position of the second magnet 3 with respect to the sensitive surface 10 of the magnetic field sensor 1.

As further illustrated in FIG. 3, the magnetic field sensor 1 also includes a plurality of magnetic field sensing elements 13 with single-axis or multi-axis (e.g. three-axis) sensing functionality, provided at a corresponding plurality of measurement locations A-H on the sensitive surface 10 of the sensor 1. The plurality of measurement locations are laterally arranged with respect to a center location "P" on the sensitive surface 10 of the sensor 1, where the rotation axis for the first magnetic source 2 intersects the sensitive surface 10, and which may be covered by a flux concentrator 14. For instance, the plurality of lateral measurement locations A-H may be disposed along a circular contour that is centered on the center location "P". This circular contour may correspond to the edge of a circularly shaped flux concentrator 14. Besides, the lateral measurement locations A-H may for instance be arranged into at least two pairs of diametrically opposite measurement locations with respect to the center location "P", i.e. are connected by virtual straight lines through the point of intersection between the sensitive surface 10 and the rotation axis in respect of the first magnet 2. For example, the embodiment of FIG. 3 comprises four pairs of diametrically opposite lateral measurement locations {(A,E); (B,F); (C,G); (D,H)}, disposed at 45 arc degrees interval along the circumference of a circle centered at the center location. Intervals of 45 arc degrees between consecutive pairs of lateral measurement locations along the circumference of the circle have the advantage that output signals obtained from the sensing elements 13 corresponding to two consecutive pairs provide an in-phase and a quadrature component for the rotation angle dependence of the quadrupolar first magnetic field contribution generated by the first magnet 2. However, embodiments of the invention are not limited to this specific angular interval, but may be configured to provide useful output signals for different angular intervals, which do not give rise to pure quadrature signals, e.g. for intervals of 15 arc degrees, 30 arc degrees, 60 arc degrees, etc. Non-limiting examples of magnetic field sensing elements 13 include planar or vertical 1D or 2D Hall probes, fluxgates or magneto-resistive elements of the xMR family, or combination thereof. The plurality of magnetic field sensing elements 13 may be laid out parallelly to the sensitive surface 10 of the magnetic field sensor 1.

Typically, the lateral measurement locations A-H are positioned close to the center location "P", wherein close means at in-plane distances small compared to the characteristic length scale over which the second magnet field contribution by the second magnetic source 3 evolves in the plane of the sensitive surface 10, but on the same order of magnitude, or larger, as the characteristic length scale over which the first magnet field contribution by the first magnetic source 2 evolves in that same plane. This has the effect that in measurements directed to local field gradients, the field gradient of the second magnetic field contribution caused by pivoting the second magnet 3 with respect to the reference position with surface normal dipole moment is much weaker than the field gradient of the first magnetic field generated by the higher-order magnetic poles of the first magnet 2. In consequence, the weaker gradients in the second magnetic field contribution can be neglected without significantly affecting the measurements directed to the local field gradient for the first magnetic field contribution. Since the first magnetic field contribution at the sensitive surface 10 is at least of quadrupolar order with a symmetry center at the center location "P", a combination of measured output signals corresponding to a pair of lateral measurement locations that is indicative of an in-plane component of the gradient of the first magnetic field contribution at the center location "P" is representative of, e.g. equal or proportional to, the same in-plane component of the first magnetic field contribution at one of the lateral measurement locations of that pair. Also for symmetry reasons, the first magnetic field contribution is substantially zero at the center location "P", which, by virtue of the mean value theorem for integrals, also holds for an approximation of the first magnetic field contribution at the center location "P" through a mean field measurement, e.g. by averaging measured output signals corresponding to a pair of lateral measurement locations. Therefore, a combination of measured output signals corresponding to a pair of lateral measurement locations that is indicative of an in-plane component of the mean field, i.e. average, for the first magnetic field contribution at the center location "P" is representative of, e.g. equal or proportional to, the same in-plane component of the second magnetic field contribution at the center location "P".

Additionally a plurality of magnetic flux concentrators 12, 14 may be present at the sensitive top surface 10 of the magnetic field sensor 1. The plurality of magnetic flux concentrators 12, 14 may be divided into two kinds of flux concentrators: a first, e.g. disk-shaped, magnetic flux concentrator 14, and a set of second, e.g. wedge-shaped, magnetic flux concentrators 12. The first magnetic flux concentrator 14 is axially and radially aligned, within tolerances, with the centers of the first magnet 2 and the second magnet 3 at rest. An axis of alignment is substantially equal to the surface normal 11 of the magnetic field sensor 1. The set of second, e.g. wedge-shaped, magnetic flux concentrators 12 is circularly and substantially equidistantly arranged around the first magnetic flux concentrator 14, which is lying in their center, covering a center location of the sensitive surface where the rotation axis for the first magnetic source 2 intersects the sensitive surface 10.

A gap 16 is created between the inner edges of each of the second magnetic flux concentrators 12 and the edge of the first magnetic flux concentrator 14. The Hall probes 13 are located close to the center portion of the gaps 16, typically slightly offset with respect to the center, such that they are at least partially covered by the corresponding, above lying second magnetic flux concentrators 12. In the particular embodiment of FIG. 3, there are eight second magnetic flux concentrators 12 arranged around the center magnetic flux concentrator 14, and each of the eight second magnetic flux concentrators 12 is, at least partially, covering eight planar Hall probes, being non-limiting examples of magnetic field sensing elements 13, manufactured within the substrate of the magnetic field sensor chip 1. Alternative embodiments of the invention may include a different number of magnetic field sensing elements 13, e.g. each three, four, five, or six magnetic field sensing elements 13, and the plurality of magnetic field sensing elements 13 may not be arranged equidistantly on a circle, but may be arranged, for example, on the corner points of a hexagon, at the four midpoints between and/or at the corner points of a rectangle.

Figure 4:
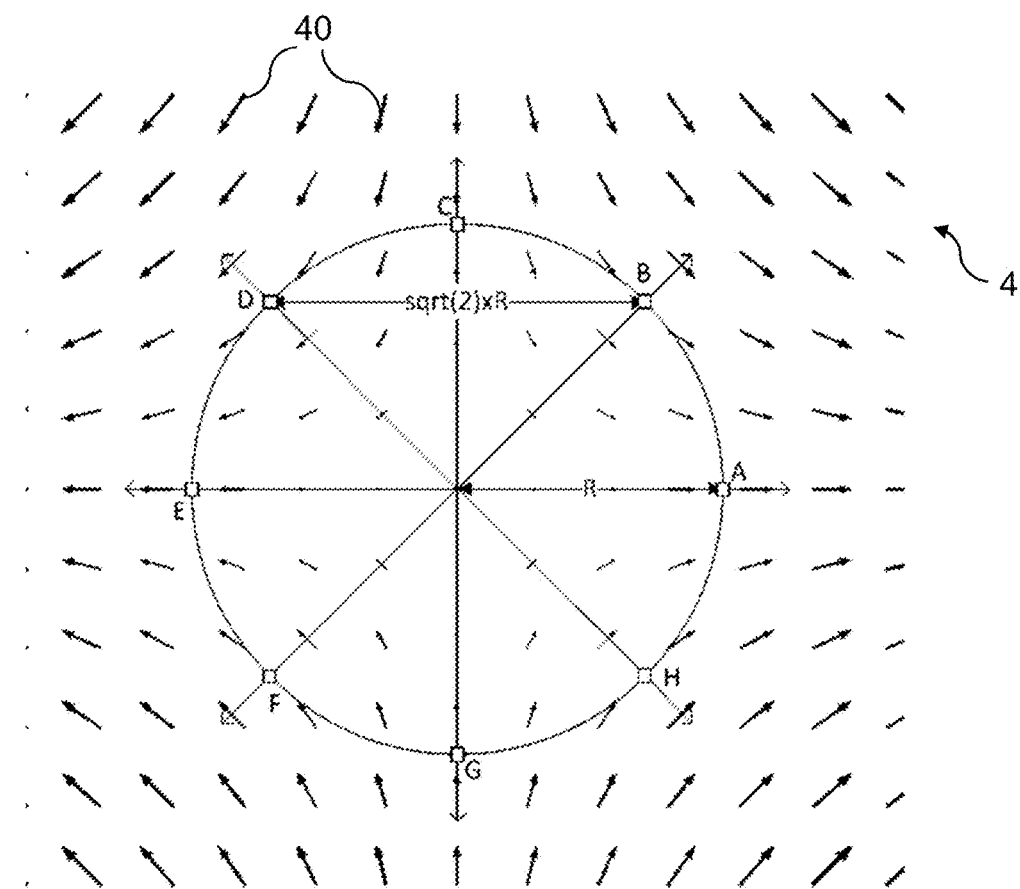
FIG. 4 illustrates a generated magnet vector field contribution at the sensitive surface of the magnetic field sensor.

The two magnetic sources, e.g. the two magnets 2, 3, generate a first and second magnetic field contribution at the sensitive surface 10 of the magnetic field sensor 1, which are superimposed to a resultant superimposition magnetic field 4 at the sensitive surface 10 of the magnetic field sensor 1. This is illustrated in FIG. 4 for an exemplary superimposition magnetic field 4 at the sensitive surface 10 of the magnetic field sensor 1. The flow of magnetic field lines is obtained by integrating, or connecting, a sequence of magnetic field vectors 40.

The magnetic flux concentrators 12, 14, if provided, are typically formed from a thin layer of ferromagnetic material of high magnetic permeability and low coercivity, e.g. from permalloy or Mu-metal, such that they strongly amplify the externally generated magnetic field and show very little hysteresis effects. This leads to an increase in detection sensitivity of the magnetic field sensor 1, e.g. by means of integrated Hall probes, magneto-resistive elements, or other kinds of magnetic field sensing element 13, with respect to the externally generated superimposition field. It also improves detection accuracy.

Furthermore, the thin-layered magnetic flux integrators 12, 14 are ideally suited for integration with wafer technology based semiconductor chips. Owing to their high magnetic permeability, the magnetic flux concentrators modify the magnetic flux, e.g. the magnetic field lines, in such a way that they are running at nearly right angles near and at their edges. This is of particular advantage because a planar integrated Hall probe, which is an example of a magnetic field sensing element 13 with a quadratic or cross-like shape, can be placed below and nearby a gap 16 that is formed between two adjacent integrated magnetic flux concentrators 12, 14, while still being penetrated at a nearly 90 arc degrees angle by an important fraction of proximate magnetic field lines. Alternatively, the planar integrated Hall probe can be placed close to the edge of a single integrated first magnetic flux concentrator 14. The proximate field lines are originating from a distant, externally generated, parallel magnetic field. A penetration at a nearly 90 arc degrees angle would not be achievable in the absence of the magnetic flux concentrators. In essence, magnetic flux concentrators 12, 14 deviate in-plane magnetic field lines or vector components of the superimposition field, i.e. field lines or components oriented parallel to the sensitive surface 10 of the sensor 1, towards a surface normal direction of the sensor 1, which constitutes a more favorable direction for sensing with magnetic field sensing elements 13 which are sensitive to only out-of-plane components of the superimposition field, for instance horizontal Hall plates.

Additionally or alternatively, two magnetic field sensing elements 13 may be provided on each side of the gap 16 (not shown). This is advantageous since a signal-to-noise ratio can be increased and stray fields, or offsets in the respective Hall probes caused by imperfect fabrication, can be compensated for.

Alternatively or additionally, vertical Hall probes may be used as magnetic field sensing elements 13 to carry out the invention, in which case they may for instance be inserted into the gap 16 formed between adjacent magnetic flux concentrators, thereby increasing their sensitivity. However, vertical Hall probes may be used as magnetic field sensing elements 13 to carry out the invention even in the absence of flux concentrators 12, 14, as will be explained further below. Another alternative for the choice of magnetic field sensing elements 13 comprises the use of fluxgates or magneto-resistive sensing elements, such as sensing elements based on magnetoresistance, giant magnetoresistance, anisotropic magnetoresistance, colossal, or extraordinary magnetoresistance.

Figure 2:
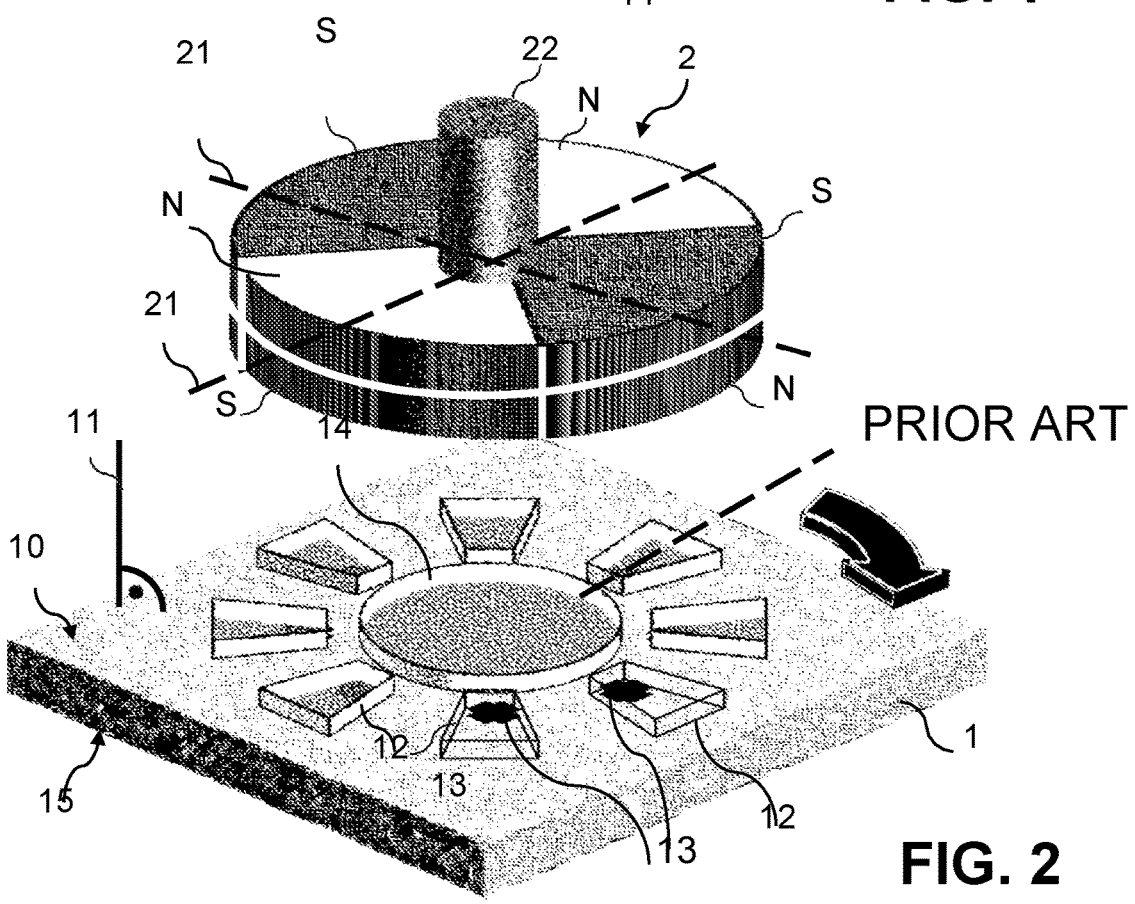
FIG. 2 is a view of a prior art sensor system using multiple integrated magnetic flux concentrators and eight Hall probes to accurately determine the rotation angle of a shaft quadrupole-field generating magnet placed above a magnetic field sensor.

FIG. 1 and FIG. 2 are an example of a sensor system for detection of a rotation angle using a single multipole magnet. Referring briefly to FIG. 1, a magnetic field sensor as previously described and a shaft magnet with magnetic diametrically opposite poles N-S are depicted. Diametrically opposite poles of the shaft magnet 2 have opposite polarity in a plane perpendicular to the rotation axis. The magnetic field sensing elements are organized into pairs of magnetic field sensing elements that are arranged diametrically opposite to each other with respect to a central location of the sensitive surface 10, where a rotation axis of the shaft magnet 2 intersects the sensitive surface 10. In close proximity to the gap regions 16, the vertical components of the concentrated and curved magnetic field lines generated by the shaft magnet 2 are traversing a first magnetic field sensing element of each pair of sensing elements in a direction opposite to that of the second magnetic field sensing element of that same pair.

Figure 6:
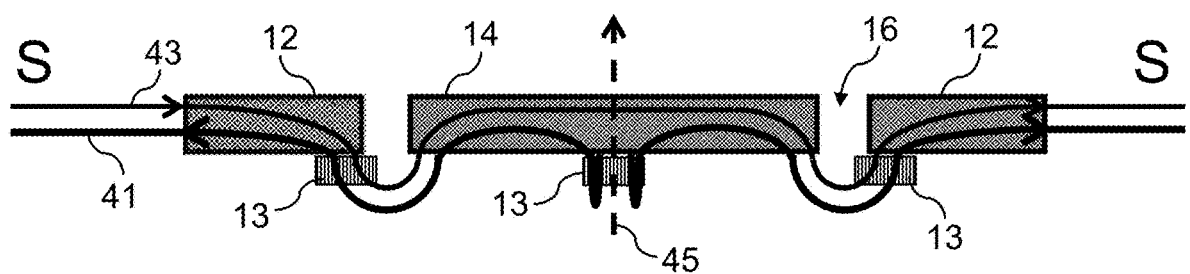
FIG. 6 is a simplified side view of a magnetic field sensor along a direction connecting the south poles of the integrated magnetic flux concentrators in which field lines of the first magnetic field contribution and the second magnetic field contribution are traced.
Figure 5:
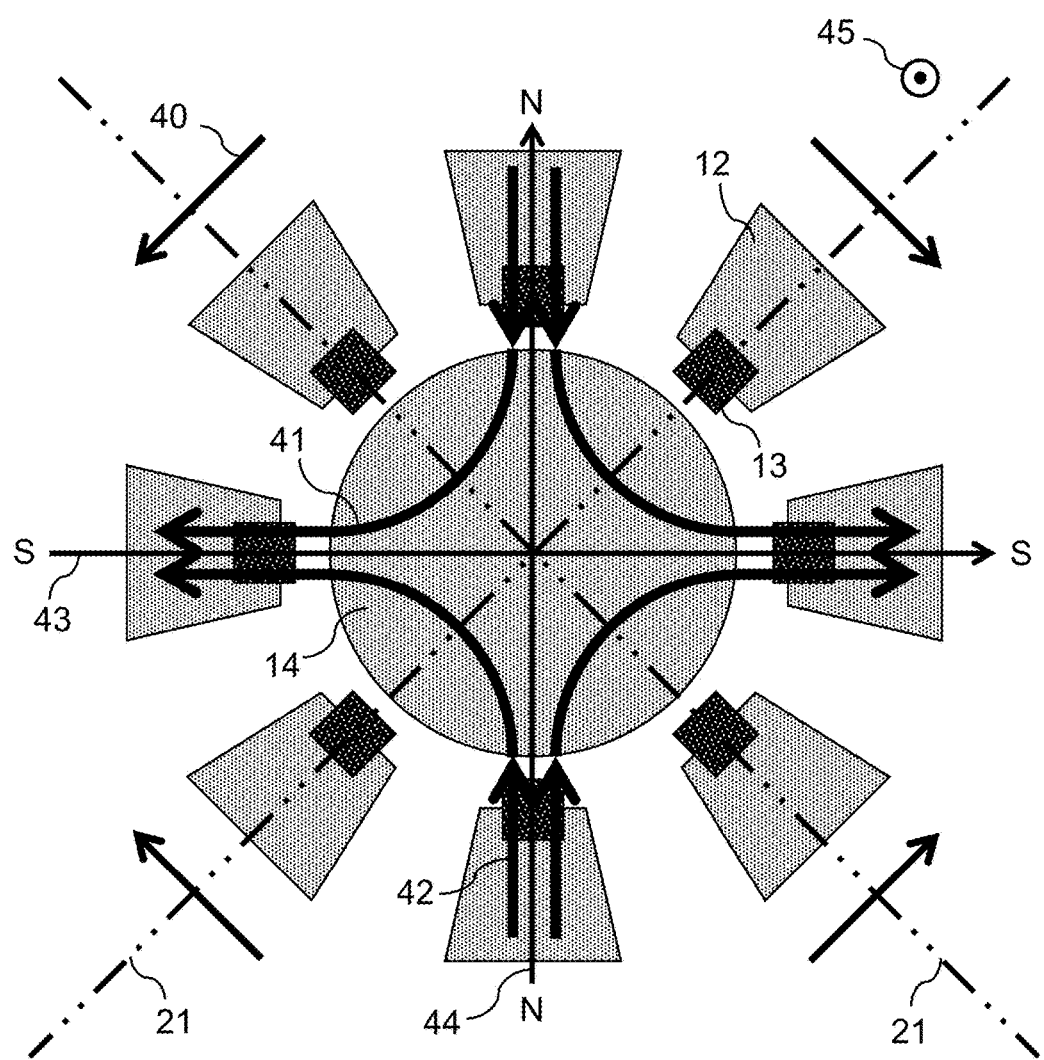
FIG. 5 is a top view of the magnetic field sensor showing the magnetic flux concentrators, the Hall probes, and characteristic field lines of both the first magnetic field contribution and the second magnetic field contribution.
Figure 7:
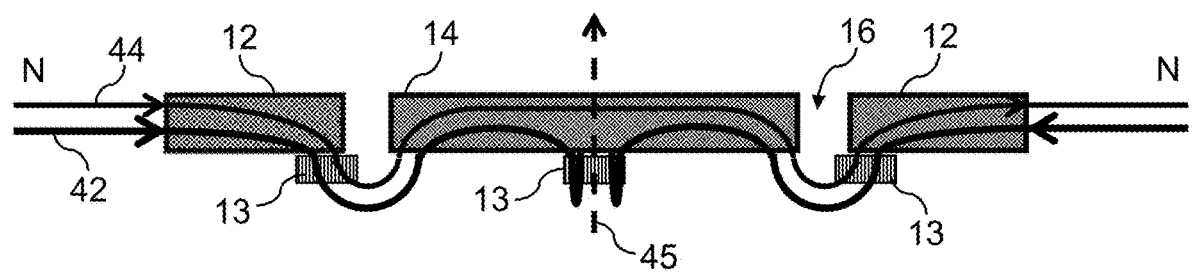
FIG. 7 is a simplified side view of a magnetic field sensor along a direction connecting the north poles of the integrated magnetic flux concentrators in which field lines of the first magnetic field contribution and the second magnetic field contribution are traced.

Referring now to the sensor system depicted in FIG. 2, a shaft magnet 2 is provided which has diametrically opposite poles N-N and S-S of equal polarity in a plane perpendicular to a rotation axis of the shaft magnet, e.g. congruent with a shaft 22. Here, the vertical components of the concentrated and curved magnetic field lines generated by the shaft magnet 2 are traversing a first magnetic field sensing element of each pair of sensing elements in a direction equal to that of the second magnetic field sensing element of that same pair, in close proximity to the gap regions 16. This is also represented in FIGS. 5-7, wherein the magnetic field lines of the magnetic field B, generated by the shaft magnet 2 of the embodiment of FIG. 2, are asymptotically running along an x-direction, $B_x$ 41, or along a y-direction, $B_y$ 42, e.g. outside and at the periphery of the portion of the sensitive surface 10 that comprises the magnetic field sensing elements 13. The field lines are bent near a gap section 16, formed between one of the set of second magnetic flux concentrator 12 and a first, e.g. disk-like, magnetic flux concentrator 14, such that they exhibit a substantial vertical component B, traversing the magnetic field sensing elements 13 substantially in a surface normal direction.

In the following, a situation is first described in which a single magnetic source, e.g. the first magnet 2, generates a magnetic field contribution at the sensitive surface 10 of the magnetic field sensor 1, and in which no further magnetic field contributions are generated, e.g. further magnetic field contributions that are the result of external magnetic stray fields or of small internal magnetic perturbations. Such a situation is illustrated in FIG. 1 or FIG. 2, in which a single shaft magnet 2 is placed above the magnetic field sensor 1 in such a way that its center and rotation axis are aligned with a surface normal line 11 relative to the sensitive surface 10, and in which other (second) magnets or magnetic stray fields are absent. If this is the case, the vertical component of the generated magnetic field, designated $B_z$, is small at the sensitive surface 10 of the sensor 1, and its contribution therefore neglectable, when compared to the sensed in-plane part of the generated magnetic field $B_{II}$. The sensed in-plane part of the magnetic field, $B_{II}$, may, however, be locally redirected along a surface normal direction, e.g. a vertical z-direction, by means of magnetic flux concentrators, if present.

In embodiments of the invention, two diametrically opposite magnetic field sensing elements 13, e.g. planar or vertical integrated Hall plates (e.g. in cross-shape), are adapted for sensing an in-plane component of the in-plane projection $B_{II}$ of the otherwise unperturbed, externally applied magnetic field B. Herein, sensing an in-plane component of the in-plane projection $B_{II}$ may comprise sensing a locally vertically deviated in-plane component. Two diametrically opposite magnetic field sensing elements 13 are typically used to increase the signal-to-noise ratio and to average out small inhomogeneities, either in the applied magnetic field, or caused by the imperfections of the magnetic flux concentrators 12, 14, or both. Even though the combination of two diametrically opposite magnetic field sensing elements 13 into a pair enjoys the benefits of delivering a robust detection signal, a single magnetic field sensing element 13 per axis suffices to detect a vector component of the in-plane magnetic field $B_{II}$ along this same axis. An averaging effect is achieved by combining, e.g. by adding or subtracting, the output signals delivered by the magnetic field sensing elements 13, e.g. by adding or subtracting the Hall voltages that are output by two diametrically opposite magnetic field sensing elements 13. Whether the two signals are added or subtracted depends on the direction of traversal of the (deviated) magnetic field lines relative to the respective magnetic field sensing elements 13. For the shaft magnet 2 shown in FIG. 1, the magnetic field lines are deviated such that they traverse the magnetic field sensing elements 13 of a pair in opposite direction, hence a difference of their output signals, e.g. Hall voltages, is chosen. In contrast thereto, for the shaft magnet 2 shown in FIG. 2, the magnetic field lines are deviated such that they traverse the diametrically opposite magnetic field sensing elements 13 of a same pair in equal direction. Therefore, generated output signals on respect of that pair are summed. The sign of an arithmetic operation may be reversed if a differential signal is sought rather than an average signal.

In cases for which the generated magnetic field B is caused by a rotatable magnet 2 placed in close proximity to the magnetic field sensor 1, a geometrical factor, $\cos(\alpha)$, accounts for the angular dependence of an in-plane component $B_{II}$, when measured by two diametrically opposite magnetic field sensing elements 13. The angle $\alpha$ may describe the rotation angle of the rotatable magnet 2 around its rotation axis and relative to a virtual line connecting the two diametrically opposite magnetic field sensing elements of one pair. This virtual line may coincide, for instance, with a first axis and spatial direction of the sensitive surface 10, e.g. with the x-axis of the magnetic field sensor 1 on the sensitive surface 10, and the rotation angle $\alpha$ is defined and determined with respect to the x-axis. Rotating the rotatable magnet 2 by an angle $\alpha$ with respect to a reference position, e.g. when a line 21 joining diametrically opposite poles of the magnet 2 is oriented parallel to the x-axis, will thus change the in-plane component $B_x$ of the magnetic field generated by the magnet 2 according to the relation of Eq. 1, wherein a maximum detectable in-plane component is given by $B_{II}$, the vector norm of the in-plane projection of the magnetic field generated by the magnet 2.

$$B_x = B_{II} \cos(\alpha) \quad (1)$$

Similarly, a pair of magnetic field sensing elements 13 aligned along a different, second axis, e.g. along the y-axis of the magnetic field sensor 1 on the sensitive surface 10, will detect an orthogonal in-plane component $B_y$ according to the relationship of Eq. 2.

$$B_y = B_{II} \sin(\alpha) \quad (2)$$

The detectable in-plane components $B_x$ and $B_y$ described so far are valid for rotations of a dipole-field generating magnet 2. If the rotatable magnet 2 is suitable for generating a quadrupole field at the sensitive surface 10, e.g. the case shown in FIG. 2, a measurement of the two orthogonal in-plane components $B_x$ and $B_y$ along the x-axis and the y-axis, respectively, is as indicated in Eq. 3. The angular dependence of the in-plane components on the rotation angle is twice the rotation angle, e.g. $2\alpha$, due to the two-fold symmetry of the magnet 2 and the polarity of the magnetic poles changing from S to N.

$$B_y = -B_{II} \cos(2\alpha) = -B_x \quad (3)$$

The terms proportional to the sine of the rotation angle, e.g. the quadrature signals proportional to $\sin(2\alpha)$, are in this case obtained by measuring pairs of diametrically opposite magnetic field sensing elements 13 for which a virtual line connecting the two sensing elements 13 of each pair are oriented at ±45 arc degrees angles with respect to the x-axis or the y-axis, e.g. along the x-y direction as stated in Eq. 4.

$$B_{x-y} = B_{II} \sin(2\alpha) \quad (4)$$

As a consequence, two pairs of magnetic field sensing elements 13, aligned along two different directions, for instance orthogonal or at 45° to each other, allow for a robust determination of the rotation angle $\alpha$ of the magnetic field generated by a first magnet 2. As a matter of fact, the ratio of the two magnetic field measurements performed in a contact-free fashion by each individual pair of magnetic field sensing elements 13 constitutes a measure of the rotation angle $\alpha$ which does not dependent on the exact in-plane magnitude, i.e. in-plane vector norm $B_{II}$, of the magnetic field generated by the magnet 2. In particular embodiments, the ratio corresponding to the tangent of the twice the rotation angle (e.g. $\tan 2\alpha$) may be provided to the user. According to the same or other embodiments, a processing unit, e.g. a processing unit which may be provided on-chip or off-chip, or a position determination module loaded into and executed by the processing unit, may be configured to perform the inverse tangent operation so as to determine the angle of rotation $\alpha$. Alternatively, the processing unit may be configured for performing a search in a look-up table, provided together with the sensor system, to determine the rotation angle $\alpha$ for a specific measured ratio of first and second in-plane components $B_x/B_y$. The look-up table may be stored in a memory which may be on-chip or off-chip and interpolation techniques may be implemented in the processing unit, e.g. a co-integrated microcontroller circuit, to refine the look-up search results to a more accurate value. In addition thereto, $B_x$ 41, $B_y$ 42, or $B_{x-y}$ as indicated in Eq. 1 to Eq. 4 may be output by the magnetic field sensor 1.

The situation described thus far does not account for the presence of additional magnetic sources such as, for example, a second magnet 3 or a perturbance field with respect to the initial, ideal magnetic field generated by only the first magnet 2. A perturbance with respect to the initial magnetic field may be the result of an alteration of the initial magnetic field because of temperature drifts, an offset in position or alignment of the first magnet 2, or offsets caused by asymmetries, gradients, etc., during fabrication of the magnetic field sensor 1. Parasitic magnetic fields, supplemental magnetic fields generated by other magnets in proximity to the magnetic field sensor 1, and perturbances may all be summarized as magnetic stray fields. For reliable detection of the rotation angle $\alpha$ in an application, the magnetic field sensor 1 has to be immune against the effects of magnetic stray fields.

A robust magnetic field sensor 1 is carrying out a rotation angle measurement in the presence of magnetic stray field $B_{err}$. To achieve this robustness, providing more than one magnetic field sensing element 13, e.g. planar Hall probe, per sensed axis of the sensitive surface 10 is generally advisable. Of course, for the above discussed ideal case, this would only provide redundant information. However, it appears from FIG. 5-7 that three new magnetic entities are present at the sensitive surface 10 of the magnetic field sensor 1 if a second magnetic source is provided as part of the sensor system in accordance with embodiments of the invention. These new magnetic entities are the vector components $B_{err\_x}$ 43, $B_{err\_y}$ 44, and $B_{err\_z}$ 45 of the magnetic stray field vector $B_{err}$, e.g. the second magnetic field contribution generated by the second magnet 3, and are now sensed by the magnetic field sensing elements 13. These new magnetic entities are overlapping with the in-plane magnetic field components $B_x$ 41 and $B_y$ 42 that one seeks to extract for the determination of the rotation angle α of the first magnet 2.

In embodiments of the invention, the superimposition magnetic field generated at the sensitive surface 10 of the magnetic field sensor 1 by the first and second magnetic field contributions is to be decomposed back into separate magnetic (vector) field contributions for the first and second magnetic sources. A quantity of interest for the determination of the rotation angle α for the first magnet 2 is the ratio of the two orthogonal in-plane components of only the first magnetic field contribution, e.g. the ration of the in-phase and quadrature components in the particular embodiment of FIG. 3, which has thus to be extracted from measurements directed at in-plane components of the superimposition field, e.g. measurements which are affected by the second magnetic (vector) field contribution $B_{err}$. Further quantities of interest for the determination of the (dynamic) relative position of the second magnet 3 are the two orthogonal in-plane components of only the second magnetic field contribution, e.g. $B_{err\_x}$ and $B_{err\_y}$, which too have to be extracted from measurements directed at in-plane components of the superimposition field, e.g. measurements which are affected by the first magnetic (vector) field contribution. If two independent in-plane components for the second magnetic field contribution have been determined by measurement, the relative position of the second magnet 3, e.g. in terms of the two geometrical variables elevation angle θ, and azimuthal angle φ, can be derived from the measurements. A decomposition of the superimposition field into the first and second magnetic field contributions thus allows for the mutual determination of both the rotation angle and the relative position.

When the sensor system is in use, this decomposition of the superimposition field into the first and second magnetic field contributions may be obtained as follows. First, the horizontal Hall probe 13 corresponding to each of the eight lateral measurement locations A-H senses a combination of an out-of-plane component (i.e. $B_{sup,z}$) and a locally redirected in-plane component (i.e. $B_{sup,x}$, $B_{sup,y}$, $B_{sup,x-y}$, or $B_{sup,y-x}$) of the superimposition field, wherein the Hall probes corresponding to a same pair of diametrically opposite lateral measurement locations are arranged for sensing the same combination of out-of-plane component and in-plane component. Examples of generated output signals HHA, HHE and HHC, HHG of sensed combinations with respect to a first pair of lateral measurement locations (A,E) and a third pair of lateral measurement locations (C,G) are given in Eq. 5. Analogous relationships can be derived for the sensed combinations in respect of the two remaining pairs of lateral measurement locations (B,F) and (D,H), involving in-plane components in the x-y and y-x direction, respectively.

$$HHA = B_x + B_{err\_x} + B_{err\_z}$$

$$HHE = B_x - B_{err\_x} + B_{err\_z}$$

$$HHC = B_y + B_{err\_y} + B_{err\_z}$$

$$HHG = B_y - B_{err\_y} + B_{err\_z} \quad (5)$$

In a next step, combinations of the generated output signals for the eight lateral measurement locations A-H are formed to obtain a first measurement indicative of, e.g. equal or proportional to, a first in-plane component of the second magnetic field contribution at the center location "P" (e.g. $B_{err,x}$), and a second measurement indicative of, e.g. equal or proportional to, a second in-plane component of the second magnetic field contribution at the center location "P" (e.g. $B_{err,y}$). Further combinations are formed to obtain a third measurement indicative of, e.g. equal or proportional to, a first in-plane component of the first magnetic field contribution (e.g. $B_x$) at one of the first pair of lateral measurement locations A, E, and a fourth measurement indicative of, e.g. equal or proportional to, a second in-plane component of the first magnetic field contribution (e.g. $B_{x-y}$) at one of the second pair of lateral measurement locations B, F.

The first measurement may be obtained by determining the (weighted) difference of Hall probe output signals of the first pair of lateral measurement locations A, E. For example, a processing unit (not shown) is determining the output signal difference HHA-HHE as stated in Eq. 6, or a proportionally weighted output signal difference, e.g. a*HHA-(1-a)*HHE. Similarly, the second measurement may be obtained by determining the (weighted) difference of Hall probe output signals of the third pair of lateral measurement locations C, G. The same processing unit may be used to determine the output signal difference HHC-HHG as stated in Eq. 6, or a proportionally weighted output signal difference, e.g. b*HHC-(1-b)*HHG. It is evident form Eq. 6 that a further (fifth) measurement indicative of, e.g. equal or proportional to, the out-of-plane component of the second magnetic field contribution at the center location "P" (e.g. $B_{err,z}$) can be obtained as well if the output signals of both the first and the third pair of lateral measurement locations A,E and C, G are summed, or if the output signals of both the first and the third pair of lateral measurement locations A,E and C, G are averaged over (e.g. mean field measurement). Here, the assumption has been made that the out-of-plane component of the second magnetic field contribution dominates by large the out-of-plane component of the first magnetic field contribution, which is often justified. However, embodiments of the invention also work if the assumption is not valid, e.g. by sensing an out-of-plane component of the superimposition field at an additional measurement location.

$$HHA - HHE = 2B_{err\_x}(\theta, \varphi)$$

$$HHC - HHG = 2B_{err\_y}(\theta, \varphi)$$

$$HHA + HHE + HHC + HHG = 4B_{err\_z}(\theta, \varphi) \quad (6)$$

The first and second measurements are based on the insight that in-plane components of the second magnetic field contribution along the x-axis, e.g. $B_{err\_x}$ 43, cancel out during the averaging action, because they traverse the magnetic field sensing elements 13 corresponding to the same pair of lateral measurement locations (A,E) in opposite direction. This is shown in FIG. 6, for an embodiment of the invention in which the first magnetic source is a quadrupole-field generating magnet 2. Furthermore, the first magnetic field contribution has in-plane components along the x-axis, e.g. $B_x$ 41 in FIG. 6, which traverse the magnetic field sensing elements 13 corresponding to the same pair of lateral measurement locations (A,E) in equal direction, whereby they are preserved during the averaging action. In an analog manner, adding the Hall voltage contributions HHC and HHG of a two Hall probes 13 corresponding to a pair of lateral measurement locations (C,G) aligned with the y-axis results in a cancellation effect for in-plane components of the second magnetic field contribution oriented along the y-axis, e.g. for $B_{err\_y}$ 44, since they traverse the two Hall probes in opposite direction. This is illustrated in FIG. 7, for an embodiment of the invention in which the first magnetic source is a quadrupole-field generating magnet 2. A particularly pleasant feature of the present embodiment is given by the fact that the second magnetic field contribution includes an out-of-plane component, e.g. $B_{err\_z}$ 45, which is conveniently canceled out if the output signals generated by four magnetic field sensing elements are judiciously combined as set out in Eq. 6.

The obtained in-plane components for the second magnetic field contribution may then be used as to the processing unit, e.g. inputs to a position determination module loaded and executed by the processing unit, to determine numerical values assigned to the constants in a physical model expressing the relationship between the measured in-plane components of the second magnetic field contribution and the two free unknowns, e.g. the two geometric variables elevation angle $\theta$ and azimuthal angle $\phi$ of the second magnet 3 of the sensor system. Optional further inputs may be used in the physical module, including, among others, the measured out-of-plane component of the second magnetic field contribution, the predetermined magnetization of the second magnet, the predetermined surface normal distance of the second magnet to the sensitive surface in the reference position. The physical model to express this relationship may be stated as a set of equations, e.g. at least two independent equations as in Eq. 6, relating a measured in-plane component of the second magnetic field contribution to the 2D angular orientation (e.g. azimuthal angle $\phi$ and elevation angle $\theta$) for the second magnet. One way to express the generated magnet field contributions $B_{err}$ is analytically as point-dipole magnetic field. The set of two or three independent equations in Eq. 6 can be solved, e.g. by the position determination module, to obtain numerical values for the two unknowns $\theta$, $\phi$ as outputs, whereby a 2D relative position for the second magnet 3 is determined.

The third measurement may be obtained by determining the (weighted) sum of Hall probe output signals of the first pair of lateral measurement locations A, E, determining the (weighted) sum of Hall probe output signals of the third pair of lateral measurement locations C, G, and subtracting the two preceding determined (weighted) sums from each other. This results in the in-phase component for the rotation angle dependent in-plane projection of first magnetic field contribution. For example, the same processing unit is configured for also determining the output signal sum HHA+HHE as indicated in Eq. 7, or a proportionally weighted output signal sum, e.g. a*HHA+(1−a)*HHE, the output signal sum HHC+HHG as stated in Eq. 7, or a proportionally weighted output signal sum, e.g. b*HHC+(1−b)*HHG, and the difference or weighted difference of the two determined sums, e.g. (HHA+HHE)−(HHC+HHG) as in Eq. 7.

$$HHA+HHE=2B_x+2B_{err\_z}$$

$$HHC+HHG=2B_y+2B_{err\_z}$$

$$(HHA+HHE)-(HHC+HHG)=2(B_x-B_y)=4B_{II}\cos(2\alpha) \qquad (7)$$

Similarly, the fourth measurement may be obtained by determining the (weighted) sum of Hall probe output signals of the second pair of lateral measurement locations B, F, determining the (weighted) sum of Hall probe output signals of the fourth pair of lateral measurement locations D, H, and subtracting the two preceding determined (weighted) sums from each other. This is also expressed in Eq. 8 and results in the quadrature component for the rotation angle dependent in-plane projection of first magnetic field contribution. The processing unit may be further configured for performing the steps of the fourth measurement in analogy to the steps of the third measurement.

$$(BH2+BH6)-(BH4+BH8)=4B_{II}\sin(2\alpha) \qquad (8)$$

It is a particular advantage of the present embodiment that linear combinations of output signals delivered by on one or more pairs of magnetic field sensing elements 13 increase the robustness of the measurements carried out by the magnetic field sensor 1. Moreover, it is of advantage that the ratio of the quadrature and in-phase component derived in Eq. 8 and Eq. 7 is proportional to the tangent of twice the rotation angle $\alpha$ and independent of the magnetic field magnitude $B_{II}$ of the in-plane projection of the first magnetic field contribution. Therefore, an output signal directed to the rotation angle $\alpha$ is easily obtainable and may be extracted by the processing unit. This ratio determines the rotation angle $\alpha$ in a robust way, e.g. insensitive to changes in the absolute magnitude of the superimposition field at the sensitive surface 10, e.g. temperature induced drifts of the magnetic field strength, height misalignments of the first or second magnet 2, 3, etc. Additionally, this finding advantageously broadens the range of acceptable tolerances vis-à-vis a positioning of the two magnets 2, 3.

In some embodiment of the present invention, more linear combinations of the magnetic field sensing element 13 output signals, e.g. readout voltages, are possibly. A surprising effect hereby is found to be the possibility to separately determine the components of the second magnetic field contribution along all three axes x, y and z. This knowledge is accompanied by numerous advantages. It permits, for instance, a calibration of the magnetic field sensor 1 with respect to positioning of the second magnet 3 in its reference position. If the second magnet 3 is offset from its ideal position, e.g. laterally or having a dipole moment that is not surface normal in the reference position, the symmetry of the sensor system arrangement is broken and perturbances in the second magnetic field contribution emerge. As these perturbances constitute a source of systematic measurement errors, it is of great interest to compensate for their presence, which is made possible by a suitable processing unit. For instance, knowledge of the out-of-plane component of the second magnetic field contribution generated by a second magnet 3 of predetermined dipole strength allows for a calibration of the surface normal distance between the second magnet 3 and the sensitive surface 10 of the sensor 1, whereas knowledge of the in-plane components of the second magnetic field contribution generated by a second magnet 3 of predetermined dipole strength allows for a correct centering with respect to the center location "P" on the sensitive surface 10 and for surface normal dipole moment orientation of the second magnet in the reference position, e.g. by comparing the values of the two orthogonal in-plane components and making them substantially equal during calibration. Embodiments of the invention are not limited to the calibration of only the second magnet source relative to the sensitive surface 10, but may also include a calibration of the first magnetic source relative to the sensitive surface 10. For instance, a surface normal orientation of the rotation axis for the first magnetic source may be obtained during calibration if the relative amplitudes of the in-phase and quadrature components are compared to each other to make them equal, while the first magnetic source is being rotated.

Figure 8:
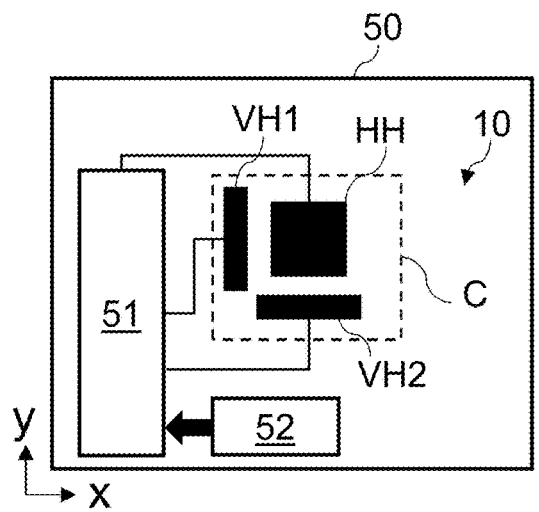
FIG. 8 and FIG. 9 are schematic top views of a magnetic field sensor in accordance with alternative embodiments of the invention, in which at least one magnetic field sensing element with three-axis sensing functionality is provided at a center measurement location.

Another embodiment of the sensor system is now described with reference to FIG. 8, which shows a schematic top view of a magnetic field sensor 50 that is part of this sensor system. The sensor system further comprises a first and a second magnetic source for generating magnetic fields (not shown), e.g. a first and a second magnet. The first and second magnet may be provided as a quadrupole magnet and a dipole magnet, respectively. A positioning of the first and second magnet relative to the magnetic field sensor may be the same as previously described for the embodiment of FIG. 3, but is not limited thereto. Alternative ways of positioning the two magnets, as well as the rotation and adjustment elements associated therewith, are described with reference to joysticks in embodiments relating to FIGS. 12-15, further below. The first and the second magnetic sources are each adapted for generating a magnetic field at the sensitive surface 10 of the magnetic field sensor 50, where the two generated magnetic fields contribute to a superimposition field, which is the resulting magnetic field sensed by the magnetic field sensor 50. The magnetic field sensor of the present embodiment differs from the embodiment of FIG. 3 in that a central measurement location "C" instead of a multiple lateral measurement location is provided in a region of the sensitive surface 10 of the magnetic field sensor 50 where the rotation axis in respect of the first magnet pierces the sensitive surface 10, e.g. the center location. The magnetic field sensor comprises at least one magnetic field sensing element at the measurement location "C", which magnetic field sensing element is configured for measuring components of the superimposition field in each one of a set of spatial directions, wherein the set of spatial directions comprises at least three independent spatial directions, e.g. the three canonical spatial directions of a 3D Euclidean coordinate system with origin at the measurement location "C". The at least one magnetic field sensing element may be provided as a single three-axis magnetic probe (e.g. integrated vector magnetometers, e.g. magnetoresistance based vector magnetometer), or may be provided as two or more magnetic field sensing elements in close proximity to each other, e.g. horizontally or vertically adjacent sensing elements. A first magnetic field sensing element, for instance, is configured for sensing in-plane components of the superimposition field (e.g. two-axis vertical Hall probe), whereas a second magnetic field sensing element is configured for sensing an out-of-plane component of the superimposition field (e.g. single-axis horizontal Hall probe). In the embodiment of FIG. 8, three magnetic field sensing elements are provided at the measurement location "C". A first sensing element "HH" may correspond to a horizontal Hall probe, e.g. integrated horizontal Hall plate, for sensing an out-of-plane component of the superimposition field, e.g. in the surface normal direction with respect to the sensitive surface 10. Further, a second and a third sensing element, "VH1" and "VH2", may correspond to two vertical Hall probes, e.g. integrated vertical Hall plates, which are aligned along different directions on the sensitive surface 10, e.g. along two orthogonal directions in the plane of the sensitive surface 10. The second and third magnetic field sensing elements are adapted for sensing two independent (e.g. non-parallel) in-plane components of the superimposition field. In consequence, the at least one magnetic field sensing element is adapted for measuring each component of the superimposition field at the single measurement location "C". An output signal of the at least one magnetic field sensing element therefore comprises measurement results relative to the three spatial vector components of the superimposition field.

The output signal of the at least one magnetic field sensing element is sent to a processing unit 51 (e.g. on-chip processor, controller, etc.) where it is used as inputs to a position determination module 52, e.g. executable computer instructions or installed software/firmware that can be loaded into the processing unit 51 for execution thereof. The position determination module is configured for determining and outputting the geometric configuration of each one of the two magnetic sources for generating magnetic fields, e.g. the two magnets, using the measurement results relative to the three spatial (vector) components of the superimposition field. The geometric configuration may be defined by the rotation angle for the first magnetic source, and by the azimuthal and elevation angle for the second magnetic source; other parametrizations of the geometry are possible in same or other embodiments of the invention.

Besides, the position determination module 52 may comprise or request further input, which is not subject to the dynamically varying magnetic field measurements. For instance, a total magnetic field strength (e.g. vector norm) of each magnet may constitute such further input, in situation in which it can be assumed to be constant. The constant values can be obtained during calibration or assembly of the sensor system. One such situation, in which the total magnetic field strength of each magnet can be assumed to be constant, corresponds to the case of having the first and the second magnet disposed at a constant distance for the measurement location "C". For instance, the first magnet is rotatably mounted with respect to the sensitive surface 10, rotating at a predetermined height (e.g. gap distance from the sensitive surface) about a rotation axis that is orthogonal to the sensitive surface, and the pivotable second magnet has a pivoting point at the measurement location "C" so as to be moveable on a spherical cap centered at the measurement location "C". For such a configuration, a change of the rotation angle for the first magnet and/or a change in the relative position (e.g. change of azimuthal and/or elevation angle) for the second magnet, by a pivoting movement constrained to the spherical cap, does not cause a change in the distance between the measurement location "C" and each one of the two magnets. For a known, e.g. measured, magnetization of each magnet, this determines the total magnetic field strength (vector norm) of each magnetic field contribution generated by the two magnets and thus of the resulting superimposition field at the measurement location "C". If the pivot point for the second magnet is located somewhere else, an angle-dependent expression of the field norm can be used when determining the geometric configurations. To cope with the varying degree of magnetization of each of the two magnets with temperature, this may be taken into account by the position determination module by providing a temperature model for each magnet, and further by also obtaining a temperature of the sensor system, e.g. by a temperature sensing element performing a temperature measurements at the location of each magnet or at the magnetic field sensor.

The inputs and optional further inputs to the position determination module 52 are used to determine the numerical values assigned to the constants in a physical model expressing the relationship between the measured (vector) superimposition field at the measurement location "C" and the three free unknowns, e.g. the geometric variables of the sensor system, which are necessary to completely define the superimposition field by reference to the respective geometric configurations of the two magnets. For instance, a physical model to express this relationship may be stated as a set of equations, e.g. at least three independent equations as in Eq. 11, relating a measured component of the superimposition field to one or more of the rotation angle α for the first magnet and the 2D angular orientation (e.g. azimuthal angle ϕ and elevation angle θ) for the second magnet. The linear superimposition property of magnetic fields has been used to derive Eq. 11, which is a vector equation comprising three independent components, e.g. in directions x, y (in-plane), and z (out-of-plane), for each of the superimposition field $B_{sup}$, the first magnetic field contribution by the first magnet $B_{m1}$, and the second magnetic field contribution by the second magnet B. The magnetic field contributions by the first and second magnet $B_{m1}$ and $B_{m2}$ are defined in Eq. 10, which is a redefinition of the generated magnet field contributions $B'_{m1}$ and $B'_{m2}$ at measurement location "C" after having evaluated all the constant parameters by their (pre-)determined numerical values. One way to express the generated magnet field contributions $B'_{m1}$ and $B'_{m2}$ is analytically as point-quadrupole and point-dipole magnetic fields. It has been assumed that inclinations of the first magnet about the rotation axis, as well as offsets of the in-plane positions of the first magnet position and the pivot point for the second magnet from the measurement location, are negligible. This is typically guaranteed by the alignment tolerances for the sensor system. The respective magnetizations M1 and M2, as well as the respective surface normal distances d1 and d2, are predetermined further inputs, e.g. known from sensor system calibration or testing, with respect to the first and second magnet. The set of three independent equations of Eq. 11 can be solved by the position determination module 52 to obtain numerical values for the three unknowns as outputs of the position determination module.

$$B'_{m1}(\alpha,\beta=0,\gamma=0,x1=0,y1=0,z1=d1,M1;C) \stackrel{def}{=} B_{m1}(\alpha)$$

$$B'_{m2}(\theta,\varphi,x2=-d2\sin\theta\cos\varphi,y2=-d2\sin\theta\sin\varphi,z2=-d2,M2;C) \stackrel{def}{=} B_{m2}(\theta,\varphi) \quad (10)$$

$$B_{sup}(C)=B_{m1}(\alpha)+B_{m2}(\theta,\varphi) \quad (11)$$

The embodiment just described has the advantage of reduced measurement complexity; only three independent measurements at a single location "C" are sufficient to determine the rotation angle for the first magnet and the relative position for the second magnet, thereby achieving 3D joystick functionality for joysticks comprising the sensor system according to the embodiment of FIG. 8. There is a trade-off between measurement complexity, e.g. the number of magnetic field sensing elements and their locations, and accuracy or robustness of the obtained rotation angle and relative position. The embodiment relating to FIG. 8 is therefore suitable for sensor systems for which tight alignment tolerances exist and which are operated in temperature-stable environments.

Figure 9:
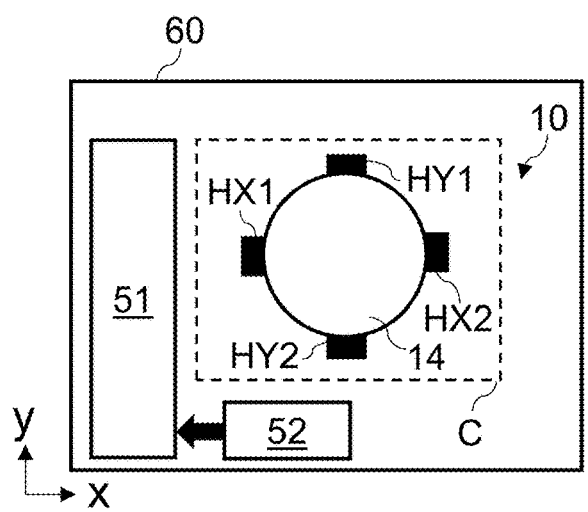

FIG. 9 shows a variant of the embodiment of FIG. 8, which facilitates planar integration of Hall probes as magnetic field sensing elements of the magnetic field sensor 60 by providing only horizontal Hall probes in combination with a magnetic flux concentrator. Therein, the in-plane components of the superimposition field are locally redirected into a vertical direction at the measurement location "C", which enables the use of only horizontal Hall probes HX1, HX2, HY1 and HY2, e.g. horizontal Hall plates. The redirection of the in-plane components of the superimposition field occurs in the vicinity of the outer edge of the central flux concentrator 14, where the horizontal Hall probes are placed. An adequately shaped flux concentrator 14, e.g. circular or square, causes different in-plane components of the superimposition field being redirected along the surface normal direction of sensitive surface 10 at different horizontal Hall probes, e.g. an in-plane component of the superimposition field along the x-axis is redirected along the surface normal direction (e.g. z-axis) for the two horizontal Hall probes HX1, HX2, whereas an in-plane component of the superimposition field along the y-axis is redirected along the surface normal direction for the two horizontal Hall probes HY1, HY2. Hence, pairs of Hall probes located at opposite edges of the concentrator are adapted for sensing an in-plane component in the direction of a virtual line joining the two Hall probes of that pair. For instance, a first pair of Hall probes HX1, HX2 is adapted for sensing an x-component of the superimposition field and a second pair of Hall probes HY1, HY2 is adapted for sensing a y-component of the superimposition field. As the redirected in-plane component sensed by a first Hall probe of a pair of Hall probes traverses the first Hall probe in a direction opposite to that of the second Hall probe of the pair, e.g. from +z to −z for Hall probe HX1 and from −z to +z for Hall probe HX2, a measurement indicative of, e.g. equal or proportional to, the local field gradient for the locally redirected superimposition field at the measurement location "C", performed by each pair of Hall probes HX1, HX2 and HY1, HY2, provides a measurement of the in-plane components of the original, i.e. not redirected, superimposition field at the measurement location "C" of the sensitive surface 10. The measurement indicative of the local field gradient in the x-direction or y-direction may be obtained by subtracting the output signals provided by the Hall probes of one pair of Hall probes, e.g. by the processing unit 51 determining the differences sig_out (HX1)−sig_out (HX2) and sig_out (HY1)−sig_out (HY2), or proportionally weighted differences of the Hall probe output signals, for the embodiment of FIG. 9. It is noted that the measurements relating to the local field gradient for the redirected superimposition field is insensitive to the out-of-plane component of the superimposition field, which is unaffected by the local flux redirection and cancels out during output signal subtraction. This is true for an out-of-plane component of the superimposition field which is of substantially equal magnitude at pairs of diametrically opposite measurement locations, e.g. for out-of-plane component of the superimposition field whose magnitude varies slowly over the area portion of the sensitive surface that is occupied by the measurement locations. This is generally the case for the weaker field gradients associated with the second magnetic source as compared with the first magnetic source and the inversion symmetry of the at least quadrupolar field generated by the first magnetic source at the sensitive surface. The out-of-plane component (e.g. in z-direction) of the superimposition field may be obtained by performing a local mean, i.e. average, field measurement with respect to the redirected superimposition field at measurement location "C", e.g. by summing the output signals provided by the Hall probes of at least one pair of Hall probes, e.g. by the processing unit 51 determining at least one of the sums sig_out (HX1)+sig_out (HX2), sig_out (HY1)+sig_out (HY2), and sig_out (HX1)+sig_out (HX2)+sig_out (HY1)+sig_out (HY2), or proportionally weighted sums of the Hall probe output signals, for the embodiment of FIG. 9. The skilled person will recognize that the arrangement of magnetic field sensing elements in combination with a flux concentrator 14, provided on the sensitive surface 10 of the magnetic field sensor 60 for the embodiment of FIG. 9, provides a functionality that is equivalent to that shown in the embodiment of FIG. 8.

Figure 10:
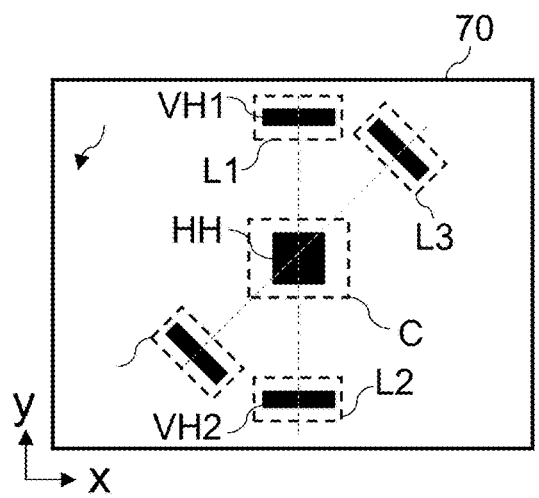
FIG. 10 and FIG. 11 are schematic top views of a magnetic field sensor in accordance with yet other embodiments of the invention, in which a plurality of magnetic field sensing element with single-axis or two-axis sensing functionality are provided at a four lateral measurement locations and at one center measurement location.

Referring to FIG. 10, a magnetic field sensor 70 according to yet another embodiment of a sensor system is described, which is capable of performing more accurate and robust measurements of the superimposition field at the sensitive surface, by determining also the total magnetic field strength, i.e. vector norm, of at least the second magnetic field contribution generated by the second magnetic source. As has been explained before, measuring the total field strength of at least the second magnetic field contribution has the advantage of actively accounting for variations in the magnetization of the second magnet with temperature and for varying surface normal distances between the sensitive surface of the magnetic field sensor and the pivotable second magnet if the pivot point does not coincide with the point of intersection between the sensitive surface and the rotation axis in respect of the first magnet. It is noted that the influence of a varying total magnetic field strength, i.e. vector norm, of the first magnetic field contribution generated by the first magnetic source can be eliminated when a ratiometric measurement is performed as described in relation to Eq. 3 and Eq. 4.

As for the foregoing embodiments of FIG. 8 and FIG. 9, a schematic top view of only the magnetic field sensor 70 of the sensor system is illustrated in FIG. 10. A positioning of the first and second magnet of the sensor system relative to the magnetic field sensor may be the same as previously described for the embodiment of FIG. 3, but is not limited thereto. Alternative ways of positioning the two magnets, as well as the rotation and adjustment elements associated therewith, are described with reference to joysticks in embodiments relating to FIGS. 12-15, further below. However, a plurality of measurement locations are provided on the sensitive surface 10 of the magnetic field sensor 70: a central measurement location "C" disposed at the point of intersection between the sensitive surface 10 and the rotation axis in respect of the first magnet, and four lateral measurement locations L1 to L4. The lateral measurement locations L1 to L4 are organized into pairs of measurement locations provided on opposite sides of the central measurement location "C", e.g. locations L1 and L2 forming a first pair and locations L3 and L4 forming a second pair. Magnetic field sensing elements are provided in respect of each lateral measurement location, and for instance also for the central measurement location "C". For the exemplary embodiment of FIG. 10, corresponding vertical Hall probes "VH1" to "VH4" are provided for each of the lateral measurement location L1 to L4, and a horizontal Hall probe "HH" is provided at the central measurement location. The magnetic field sensing elements "VH1", "VH2" corresponding to the first pair of lateral measurement locations L1, L2 are each adapted for measuring a same first in-plane component of the superimposition field at the sensitive surface 10 such that a difference, or weighted difference, of the measured output signals generated by these magnetic field sensing elements is substantially indicative of, e.g. equal or proportional to, a first in-plane component of the gradient of the first magnetic field contribution at the central measurement location "C", and further such that a sum, or weighted sum, of the measured output signals generated by these magnetic field sensing elements is substantially indicative of, e.g. equal or proportional to, a first in-plane component of the second magnetic field contribution at the central measurement location "C". Likewise, the magnetic field sensing elements "VH3", "VH4" corresponding to the second pair of lateral measurement locations L3, L4 are each adapted for measuring a same second in-plane component, different from the first in-plane component, of the superimposition field at the sensitive surface 10 such that a difference, or weighted difference, of the measured output signals generated by these magnetic field sensing elements is indicative of, e.g. equal or proportional to, a second in-plane component of the gradient of the first magnetic field contribution at the central measurement location "C", and further such that a sum, or weighted sum, of the measured output signals generated by these magnetic field sensing elements is substantially indicative of, e.g. equal or proportional to, a second in-plane component of the second magnetic field contribution at the central measurement location "C". The magnetic field sensing element "HH" corresponding to the central measurement location "C" is adapted for measuring an out-of-plane component of the superimposition field at the central measurement location "C".

The measurement locations of each pair of measurement locations may be located diametrically opposite to each other, i.e. may be connected by virtual straight lines through the point of intersection between the sensitive surface 10 and the rotation axis in respect of the first magnet, although deviations from the preferred locations are supported within predetermined tolerances, e.g. tolerances expressed relative to the resulting reduction in accuracy for the measurements directed to the field gradient and the mean field, i.e. average field, or for the determined rotation angle and relative position. Typically, measurement locations of each pair of measurement locations are located equidistantly from the central measurement location "C", although weighting of the output signals generated by the two magnetic field sensing elements of one pair in proportion to their distance to the central measurement location "C" can be implemented to compensate locations that are not equidistant. Furthermore, the second pair of measurement locations L3, L4 is rotated by an angle of 45 arc degrees with respect to the first pair L1, L2 in the plane of the sensitive surface 10 to generate a quadrature output signal for the first magnet. However, embodiments of the invention are not limited to this specific angle, but may be configured to provide useful output signals for different angles, e.g. 15 arc degrees, 30 arc degrees, 60 arc degrees, etc., which are not pure quadrature signals.

Typically, the lateral measurement locations are positioned close to the central measurement location, wherein close means at in-plane distances small compared to the characteristic length scale over which the second magnet field contribution evolves in the plane of the sensitive surface 10, but on the same order of magnitude, or larger, as the characteristic length scale over which the first magnet field contribution evolves in the plane of the sensitive surface 10. This has the effect that in measurements directed to local field gradients, the field gradient of the second magnetic field contribution caused by pivoting the second magnet with respect to a reference position with surface normal dipole moment is much weaker than the field gradient of the first magnetic field generated by the higher-order magnetic poles of the first magnet. In consequence, the weaker gradients in the second magnetic field contribution can be neglected without significantly affecting the measurements directed to the local field gradient for the first magnetic field contribution.

Since the first magnetic field contribution at the sensitive surface 10 is at least of quadrupolar order with a symmetry center at the central measurement location "C", a combination of measured output signals corresponding to a pair of lateral measurement locations that is indicative of an in-plane component of the gradient of the first magnetic field contribution at the central measurement location "C" is representative of, e.g. equal or proportional to, the same in-plane component of the first magnetic field contribution at one of the lateral measurement locations of that pair. Expressed in other words, one can make use of the relationship in Eq. 12, which is a consequence of the symmetry of the first magnetic field contribution on the sensitive surface 10. Similar relationships hold for the second pair of lateral measurement locations L3, L4. Also for symmetry reasons, the first magnetic field contribution is substantially zero at the center measurement location "C", which, by virtue of the mean value theorem for integrals, also holds for the approximation of the first magnetic field contribution at the center measurement location "C" through a mean field measurement, e.g. by averaging measured output signals corresponding to a pair of lateral measurement locations, e.g. by using the relationship of Eq. 13, with similar relationships holding for the second pair of lateral measurement locations L3, L4. Therefore, a combination of measured output signals corresponding to a pair of lateral measurement locations that is indicative of an in-plane component of the mean field, i.e. average, for the first magnetic field contribution at the central measurement location "C" is representative of, e.g. equal or proportional to, the same in-plane component of the second magnetic field contribution at the central measurement location "C".

$$\nabla B_{m1}(C) \approx \frac{B_{m1}(L1) - B_{m1}(L2)}{|L1 - L2|} \propto B_{m1}(L1) \quad (12)$$

$$\langle B_{m1}(C) \rangle = \frac{B_{m1}(L1) + B_{m1}(L2)}{2} \approx 0 \quad (13)$$

During operation of the sensor system, a first measurement indicative of, e.g. equal or proportional to, a first in-plane component of the first magnetic field contribution at one of the first pair of lateral measurement locations L1, L2 may therefore be obtained by determining the (weighted) difference of Hall probe output signals of this first pair of lateral measurement locations L1, L2. As the field gradients of the second magnetic field contribution are neglectable compared to the field gradients of the first magnetic field contribution at the central measurement location "C", this first measurement approximates very well, and is substantially equal to, a measurement representative of only the first magnetic field contribution at one of the first pair of lateral measurement locations L1, L2. A processing unit (not shown) is determining the output signal difference sig_out (VH1)–sig_out (VH2), or a proportionally weighted output signal difference, e.g. a*sig_out (VH1)–(1–a)*sig_out (VH2). Similarly, a second measurement indicative of, e.g. equal or proportional to, a second in-plane component of the first magnetic field contribution at one of the second pair of lateral measurement locations L3, L4 may be obtained by determining the (weighted) difference of Hall probe output signals of this second pair of lateral measurement locations L3, L4. The same processing unit may be used to determine the output signal difference sig_out (VH3)–sig_out (VH4), or a proportionally weighted output signal difference, e.g. b*sig_out (VH3)–(1–b)*sig_out (VH4). Further, a third measurement indicative of, e.g. equal or proportional to, a first in-plane component of the second magnetic field contribution at the central measurement location "C" may be obtained by determining the (weighted) sum of Hall probe output signals of the first pair of lateral measurement locations L1, L2. Again, the same processing unit may be used for determining the output signal sum sig_out (VH1)+sig_out (VH2), or a proportionally weighted output signal sum, e.g. a*sig_out (VH1)+(1–a)*sig_out (VH2). Likewise, a fourth measurement indicative of, e.g. equal or proportional to, a second in-plane component of the second magnetic field contribution at the central measurement location "C" may be obtained by determining the (weighted) sum of Hall probe output signals of the second pair of lateral measurement locations L3, L4. Again, the same processing unit may be used for determining the output signal sum sig_out (VH3)+sig_out (VH4), or a proportionally weighted output signal sum, e.g. b*sig_out (VH3)+(1–b)*sig_out (VH4). For the embodiment shown in FIG. 10, the second in-plane direction is in the x-y direction, e.g. is not orthogonal to the first in-plane direction, e.g. the y-direction. Optionally, the out-of-plane component of the superimposition field at the central measurement location "C" may be measured by the horizontal Hall probe "HH" in a fifth measurement.

Next, the first and the second measurement results are divided to eliminate the influence of the vector norm of the first magnetic field contribution on the rotation angle determination. This is indeed possible because the first and the second measurement results are respectively corresponding to an in-phase component and a quadrature component of the rotation angle dependent first magnetic field contribution projection onto the sensitive surface 10. The angle encompassed by the two virtual lines joining the respective lateral measurement locations of each pair of lateral measurement locations amounts to 45 arc degrees in the embodiment of FIG. 10. Taking into account the two-fold symmetry of a quadrupole field generated by the first magnet, the rotation angle dependence is twice the rotation angle, e.g. 2α=90 arc degrees. It is therefore true that the first and the second pair of lateral measurement locations provide in-phase and quadrature components for the magnetic vector field corresponding to the projection of the first magnetic field contribution onto the sensitive surface 10. A previously described in detail in relation to Eq. 2 and Eq. 3 of the embodiment of FIG. 3, an inverse tangent function may be evaluated for the ratio of first and second measurement result, e.g. by the position determination module (not shown) receiving the first and second measurement result, to obtain the rotation angle for the first magnet.

Next, the fourth measurement is used to generate a modified fourth measurement which is representative of the x-component of the second magnetic field contribution, e.g. by using the relationship $B_{m2,x} = B_{m2,x-y} * \text{sqrt}(2) - B_{m2,y}$ derived from projections. The third measurement is already representative of the y-component of the second magnetic field contribution. The third and fourth, or modified fourth, measurements are used as two independent inputs to the position determination module (not shown) for determining the two unknown geometric variables related to the second magnet, e.g. the azimuthal angle φ and the elevation angle θ. For instance, the position determination module may comprise a solver, e.g. nonlinear or iterative solver, for inverting the relationship between an analytical expression (e.g. point-dipole magnetic field) for the determined x-component and the y-component of the second magnetic field contribution at the central measurement location "C" and the dependent variables φ, θ. In this case, a predetermined value of the vector norm of the second magnetic field contribution, or alternatively a predetermined value of the magnetization of the second magnet and a predetermined surface normal distance value d2, are assumed to be constant further inputs to the position determination module.

In a variant thereof, the vector norm of the second magnetic field contribution at the central measurement location "C" is treated as a further input variable, i.e. is assumed to be non-constant, providing a more robust sensor system. This means that a further independent measurement is necessary to derive a unique numerical value of this vector norm. This can be achieved by obtaining a vector norm of the in-plane projection of the first magnetic field contribution at a lateral measurement location, by configuring the position determination module to determine the quadratic mean of the first and second measurements if they are provided as in-phase and quadrature components. Based on this in-plane vector norm at the lateral measurement location, the position determination module or the processing unit determine the magnetization M1, e.g. the quadrupole moment, of the first magnet and uses this intermediate result to determine the out-of-plane component of the first magnetic field contribution at the central measurement location "C". Then, a modified fifth measurement is generated by subtracting the determined out-of-plane component of the first magnetic field contribution at the central measurement location "C" from the fifth measurement. Eventually, the modified fifth measurement is used, in addition to the third and (modified) fourth measurement, by the position determination module to invert the relationship between an analytical expression (e.g. point-dipole magnetic field) for the determined x-component, y-component, and z-component of the second magnetic field contribution at the central measurement location "C" and the dependent variables $\phi$, $\theta$, and $|B_{m2}|$.

Figure 11:
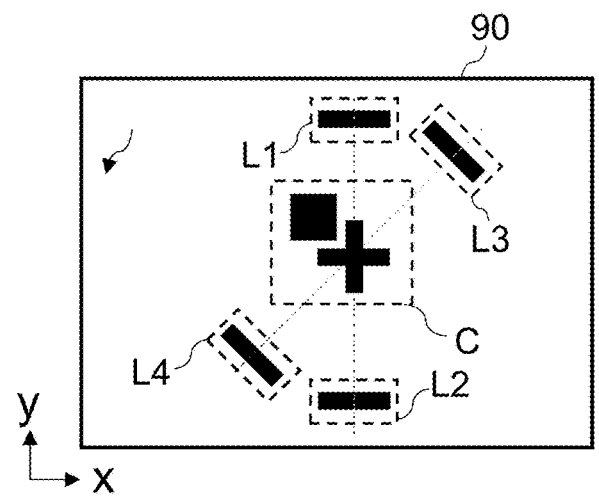

FIG. 11 shows a variant of the embodiment in FIG. 10, in which the central measurement location "C" on the sensitive surface 10 of a magnetic field sensor 90 contains two additional magnetic field sensing elements, e.g. the two vertical Hall probes VH5 and VH6 forming a cross-shaped 2D vertical Hall probe for sensing in-plane components of the superimposition field at measurement location "C", which are substantially equal to the in-plane components of the second magnetic field contribution at measurement location "C". In consequence, no mean field measurements are necessary for this embodiment to obtain the in-plane components of the second magnetic field contribution at measurement location "C", e.g. no determination is required of (weighted) sums of Hall probe output signals generated by magnetic field sensing elements provided at paired lateral measurement locations. Except for this difference, the embodiment of FIG. 11 is functioning in the same way as the embodiment relating to FIG. 10.

In the embodiments referred to in FIG. 10 and FIG. 11, instead of providing vertical Hall probes at the lateral measurement locations, horizontal Hall probes may be provided in combination with a magnetic flux concentrator, e.g. circular or annular shaped flux concentrator centered at the measurement location "C". A processing unit, e.g. a processing unit comprising or adapted for loading and executing the instructions of the position determination module may be provided on-chip for a chip-manufactured magnetic field sensor, or may be provided off-chip via suitable interconnects and/or wired or wireless communication channels.

In some embodiments of the invention, a processing unit of the sensor system may perform a calibration step with respect to a static, external magnetic stray field which interferes with the superimposition field generated by the two magnets 2, 3, e.g. by removing a constant offset or background sensor signal in recorded out-of-plane components for the second magnetic source while a relative position thereof is being changed dynamically. Alternatively, a redundant set of magnetic field sensing elements may be used for this purpose, arranged in such a way as not being influenced by the first and second magnetic field contributions.

The magnets 2, 3 may typically have diameters/principal axis in the range between 5 mm to 15 mm. Their distance to the first sensitive surface 10 of the magnetic field sensor 1, or to the second surface 15, e.g. the top/bottom surface, is generally chosen so as to avoid magnetic saturation of the magnetic field sensor 1. Field strength typically vary in the range between 10 mT to 100 mT and the corresponding operating air gaps typically lie between 0.5 mm and 20 mm. Depending on cost factors, operable temperature range, drift, aging effects, etc., the material of the two magnets 2, 3 may be selected from one of the following hard ferrite, Samarium-Cobalt, Aluminum-Nickel-Cobalt, Neodymium, but is not restricted thereto. Alternatively coil arrangements may be energized to create magnetic dipoles, quadrupoles, etc.

The invention is not limited to the use of a dipole or quadrupole permanent magnet and is applicable to hexapole magnets, octupole magnets, and so on. For those embodiments it may be convenient to choose a different number or geometric arrangement of magnetic field sensing elements 13 and form different linear combinations of their output signals. A gain in sensor accuracy may, however, be accompanied by a loss in sensor speed and an increase in cost and a careful selection of those design freedoms is thus necessary for every particular target application. An alternative embodiment may comprise two or more, possibly identical, sensing units, wherein each sensing unit comprises at least the aforementioned magnetic field sensing elements 13, the readout of which are combinable, and optionally comprises the geometrically arranged magnetic flux concentrators 12, 14. However, no extra magnets are required for a second or more sensing units. This additional redundancy further increases signal-to-noise ratio, increases accuracy of the rotation angle and 3D position measurements, and guarantees operability of the magnetic field sensor 1 even in the case of failure of one of the sensing units. For that purpose the sensor system may further comprise a suitable processing unit for carrying out a self-diagnostic test routine.

The outputs of the magnetic field sensor 1 may be in analog, e.g. ratiometric, or digital format, e.g. a 12-bit or 16-bit digital signal. Particular communication interfaces may be among others the serial SPI protocol or the SENT protocol. Moreover, it may be advantageous to use pulse width modulated (PWM) signals as the magnetic field sensor 1 output signals as this is a commonly used signal type for power delivery systems.

In particular embodiments of the invention, the integrated magnetic field sensor 1 chip may for instance be packaged as SOIC-8 or TSSOP16 package and may communicate with external devices through their connector terminals. This is advantageous because it offers the possibility to fully configure and specify the magnetic field sensor 1 output transfer characteristics through end-of-line calibration. In particular embodiments of the invention, a calibration step may comprise offset calibration with respect to the positioning of the two external magnets 2, 3, but is not restricted thereto. Other calibration procedural steps may be carried out, such as offset compensation of the magnetic field sensing elements 13 due to manufacturing imperfections, gain regulation if sensor signals are further amplified, compensation of thermal drifts of the generated magnetic fields, range and filtering settings, settings relative to sensor linearity or clamping levels, etc. It may be particularly practical to use an external programming unit, to communicate and calibrate the magnetic field sensor 1.

In a second aspect, embodiments of the present invention are directed to a joystick with 3D functionality, which comprises a sensor system according to any of the described embodiments of the first aspect. The joystick may further comprise a handle which is rotatable around a longitudinal axis of rotation of the joystick and pivotable around two transverse axes of the joystick. The longitudinal axis of the joystick handle corresponds to the rotation axis of the first magnetic source. Elements for adjusting a relative position or source orientation of the second magnetic source with respect to the sensitive surface are provided as part of the joystick to allow for a pivoting movement of the joystick handle.

Figure 12:
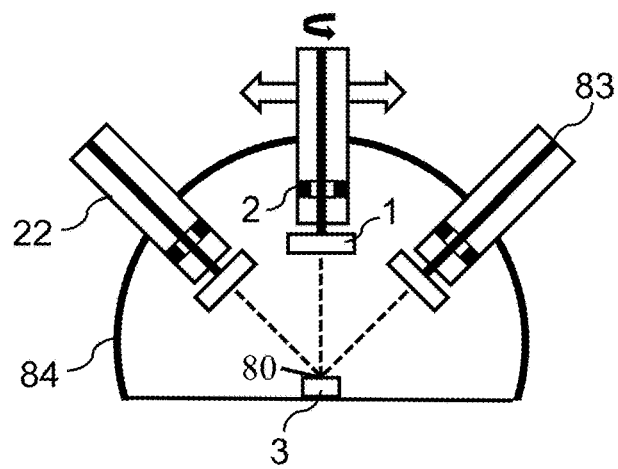
FIG. 12 to FIG. 15 are schematics of a 3D joystick using a sensor system according to embodiments of the invention.

In an exemplary embodiment of the invention, illustrated in FIG. 12, the first magnet 2, generating a quadrupole-field at the sensitive surface of the magnetic field sensor 1, is attached inside the hollow of a shaft 22, e.g. the handle of a joystick. The shaft or handle is mechanically provided with rotation elements such that rotating the shaft 22 or handle brings about a rotation of the magnet 2, but not of the magnetic field sensor 1, nor of the second magnet 3. Such rotation elements may comprise an inner shaft 83 in bearings and surrounded by an outer tube of the shaft 22 such that the outer tube is rotatable relative to the inner shaft 83, but other rotation elements are conceivable too. In particular applications this may generate translations in the Z-direction or may correspond to yaw angles. Additionally, the joystick is provided with mechanical elements that enable a 3D function thereof. This may be a gimbal mount 84, a ball and socket type mount, etc., to which the shaft 22 of a joystick is attached. According to such an embodiment, the magnetic field sensor 1 is manufactured as an integrated chip, e.g. an integrated semiconductor chip, and is also coupled to the shaft 22 of the joystick via an end portion of the inner shaft 83, whereas the second magnet 3 remains in a fixed position at a base. As a consequence the shaft 22 or handle of a joystick is rotatable around its axis thereby enabling rotation of the first magnet 2 with respect to the magnetic field sensor 1 and its top/sensitive surface 10. Furthermore, the shaft 22 or handle of a joystick is also displaceable in 3D space, e.g. by a gimbal mount 84, thereby displacing the second magnet 3 relative to the magnetic field sensor 1. Such a displacement typically occurs on the two-dimensional surface of a portion of an imaginary sphere or hemisphere with a center 80 located at the second magnet 3 and may therefore be characterized in terms of an azimuthal angle coordinate φ and an elevation angle coordinate θ (e.g. at least +/−30 deg each, going up to +/−70 deg each); in specific applications this may generate translations in both X direction and Y-direction or may correspond to roll and pitch angles.

Figure 13:
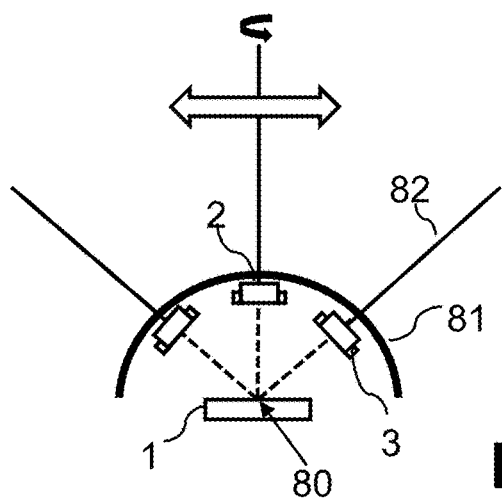

FIG. 13 illustrates another embodiment of a 3D joystick using any of the described sensor systems for which the first and second magnetic source, e.g. the first and second magnet 2, 3, are mechanically secured by suitable coupling means and located above the magnetic field sensor 1. A joystick handle, providing the rotation elements and also defining the rotation axis 82, may be inclined with respect to a virtual rotation center 80, located at the sensitive surface of the magnetic field sensor 1. In consequence, both the first magnet 2 and the second magnet 3 are displaceable in three dimensional space with their centers moving on an imaginary portion of a sphere 81.

Figure 14:
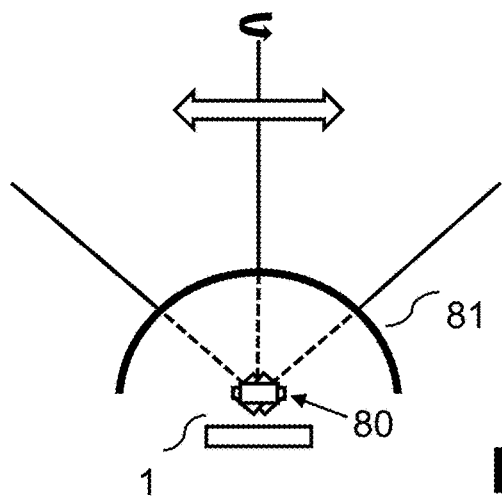

In FIG. 14, a 3D joystick is characterized by a rotation center 80 for the joystick handle and for the associated rotation axis 82 that coincides with the center locations of the first and second magnet 2, 3 above the magnetic field sensor 1. For this 3D joystick and the comprised sensor system, the first and second magnetic sources are mechanically fastened one to another and the second magnetic source, e.g. the second magnet 3, has a constant relative center position with respect to the magnetic field sensor 1. Its associated magnetic moment, however, is still rotatable in its orientation and may be characterized by an elevation angle and an azimuthal angle.

Figure 15:
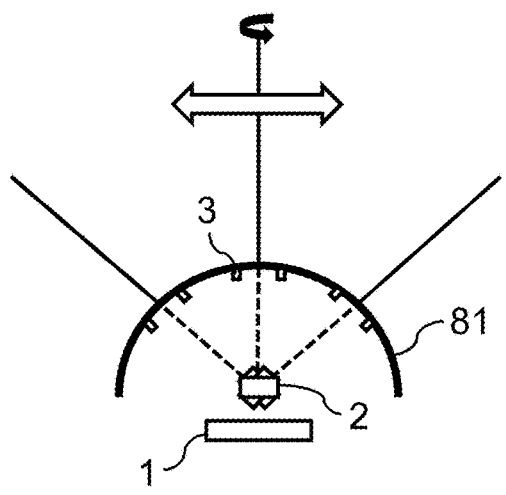

In an embodiment for a 3D joystick and the sensor system included therein, as shown in FIG. 15, the first and second magnetic sources are positioned above the magnetic field sensor 1 and are mechanically coupled to a joystick shaft providing a rotation axis. In this particular embodiment, however, the first and second magnet 2, 3 are not directly coupled one to another, but are positioned at a distance from each other. In consequence, the first magnet 2 has a constant center position with respect to the magnetic field sensor 1, whereas the second magnet 3 is displaceable in 3D space on an imaginary portion of a hemisphere 81.

While the invention has been illustrated and described in detail in the drawings and foregoing description, such illustration and description are to be considered illustrative or exemplary and not restrictive. The foregoing description details particular embodiments of the invention. It will be appreciated, however, that no matter how detailed the foregoing appears in text, the invention may be practiced in many ways. The invention is not limited to the disclosed embodiments.

Other variations to the disclosed embodiments can be understood and effected by those skilled in the art in practicing the claimed invention, from a study of the drawings, the disclosure and the appended claims. In the claims, the word "comprising" does not exclude other elements or steps, and the indefinite article "a" or "an" does not exclude a plurality. A single processor or other unit may fulfill the functions of several items recited in the claims. The mere fact that particular measures are recited in mutually different dependent claims does not indicate that a combination of these measures cannot be used to advantage. Any reference signs in the claims should not be construed as limiting the scope.

The invention claimed is:

1. A sensor system for use in a joystick, comprising:
    a magnetic field sensor having a sensitive surface,
    a first magnetic source, rotatably mounted relative to the sensitive surface, for generating a first magnetic field contribution of at least quadrupolar order at the sensitive surface, a rotating movement of the first magnetic source with respect to the sensitive surface being defined by a rotation angle, and
    a second magnetic source, pivotable to a plurality of source orientations with respect to the sensitive surface, for generating a second magnetic field contribution at the sensitive surface, each source orientation with respect to the sensitive surface being defined by two angular directions,
wherein the magnetic field sensor is configured for:
    detecting at least an in-plane component of a superimposition field of the generated first and second magnetic field contributions for each of a plurality of lateral measurement locations provided on the sensitive surface, the plurality of lateral measurement locations being arranged laterally and into at least two pairs of diametrically opposite measurement locations with respect to a center location on the sensitive surface, for detecting at least the same in-plane component of the superimposition field at the measurement locations corresponding to a same pair, obtaining measurements indicative of a field gradient for at least two in-plane components of the first magnetic field contribution, based on a plurality of detected spatial components of the superimposition field corresponding to the plurality of lateral measurement locations, obtaining measurements indicative of a field mean for at least two in-plane components of the second magnetic field contribution at the center location, based on a plurality of detected spatial components of the superimposition field corresponding to the plurality of lateral measurement locations and/or based on at least two further detected in-plane components of the superimposition field at the center location, determining the rotation angle for the first magnetic source from the obtained field gradient measurements and the two angular directions for the second magnetic source from the obtained field mean measurements.

2. The sensor system according to claim 1, wherein the magnetic field sensor is further configured for obtaining a measurement indicative of a field mean for an out-of-plane component of the second magnetic field contribution at the center location, based on a plurality of detected spatial components of the superimposition field corresponding to the plurality of lateral measurement locations and/or based on a further detected out-of-plane component of the superimposition field at the center location.

3. The sensor system according to claim 1, wherein the magnetic field sensor is configured for obtaining measurements indicative of the field gradient and/or the field mean by combining sums and/or differences of the detected spatial components of the plurality of detected spatial components of the superimposition field corresponding to a same pair of lateral measurement locations on the sensitive surface.

4. The sensor system according to claim 1, wherein the magnetic field sensor is configured for determining the two angular directions for the second magnetic source from the obtained field mean measurements by providing a physical model for the second magnetic source to relate variations in the second magnetic field contribution generated at the center location to variations in the two angular directions, and determining the two angular directions as a solution to the physical model, using the obtained field mean measurements at the center location as model constraints.

5. The sensor system according to claim 1, wherein the magnetic field sensor is configured for detecting two different in-plane components, or an in-plane component and an out-of-plane component, of the superimposition field for at least one of plurality of lateral measurement locations and the center location.

6. The sensor system according to claim 1, wherein an angle formed between lines connecting the two lateral measurement locations of each pair of lateral measurement locations is an integer multiple of 45 arc degrees.

7. The sensor system according to claim 1, wherein a rotation axis for the rotatably mounted first magnetic source intersects the sensitive surface of the magnetic field sensor at the center location.

8. The sensor system according to claim 1, further comprising mechanical coupling elements between the first magnetic source and the second magnetic source for maintaining the first magnetic source at a constant relative position with respect to the second magnetic source.

9. The sensor system according to claim 1, wherein the first and second magnetic source are positioned at a same side of the sensitive surface, and/or wherein the first and second magnetic source are positioned at opposite sides of the sensitive surface.

10. The sensor system according to claim 1, wherein a relative position of the center of the second magnetic source is constant with respect to the magnetic field sensor, independently of the rotation angle, when the second magnetic source is being pivoted, and/or the wherein the relative position of the center of the second magnetic source moves on a spherical surface when the second magnetic source is being pivoted.

11. The sensor system according to claim 1, wherein the first magnetic source is a quadrupole, hexapole, or octupole permanent magnet, and/or wherein the second magnetic source is a dipole electromagnet or dipole permanent magnet.

12. The sensor system according to claim 1, wherein the magnetic field sensor comprises a plurality of magnetic field sensing elements arranged at the plurality of measurement locations on the sensitive surface.

13. The sensor system according to claim 12, wherein at least one of the plurality of magnetic field sensing elements comprises at least one of the group consisting of a planar Hall-effect probe, a magneto-resistive probe, a vertical Hall-effect probe, and a fluxgate probe.

14. The sensor system according to claim 12, wherein the magnetic field sensor further comprises a plurality magnetic flux concentrators, each being arranged on the sensitive surface such that a flux of the superimposition field is concentrated at the magnetic field sensing elements.

15. The sensor system according to claim 1, further comprising a processing unit adapted for determining and compensating an offset in the relative position and/or orientation of a center of each one of the first and second magnetic source.

16. The sensor system according to claim 1, further comprising a rotatable shaft coupled to the first magnetic source or the magnetic field sensor, for rotating the first magnetic source about a longitudinal axis of the shaft and relative to the sensitive surface, and a pivotable holding member for securing the magnetic field sensor or the second magnetic source and for pivoting the second magnetic source relative to the sensitive surface.

17. The sensor system according to claim 16, wherein the pivotable holding member is coupled to, or is forming part of, a gimbal mount or a ball-and-socket mount.

18. A sensor system for use in a joystick, comprising:
a magnetic field sensor having a sensitive surface,
a first magnetic source, rotatably mounted relative to the sensitive surface, for generating a first magnetic field contribution of at least quadrupolar order at the sensitive surface, a rotating movement of the first magnetic source with respect to the sensitive surface being defined by a rotation angle, and
a second magnetic source, pivotable to a plurality of source orientations with respect to the sensitive surface, for generating a second magnetic field contribution at the sensitive surface, each source orientation with respect to the sensitive surface being defined by two angular directions,
wherein the magnetic field sensor is configured for:
detecting three spatial components of a superimposition field of the generated first and second magnetic field contributions at a center location on the sensitive surface, providing a physical model for the magnetic sources to relate variations in the superimposition field generated at the center location to variations in the rotation angle and the two angular directions, determining the rotation angle for the first magnetic source and the two angular directions for the second magnetic source as a solution to the physical model, using the detected components of the superimposition field at the center location as model constraints.

19. A joystick comprising a sensor system according to claim 1.

20. A joystick comprising a sensor system according to claim 18.

* * * * *